(12) United States Patent
Matousek et al.

(10) Patent No.: US 9,335,153 B2
(45) Date of Patent: May 10, 2016

(54) STORAGE MEDIA ASPERITY CHARACTERIZATION

(71) Applicant: Seagate Technology LLC, Cupertino, CA (US)

(72) Inventors: Robert Matousek, Berthoud, CO (US); Kevin David Powers, Longmont, CO (US); Dale Thomas Riley, Longmont, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 436 days.

(21) Appl. No.: 13/627,731

(22) Filed: Sep. 26, 2012

(65) Prior Publication Data
US 2014/0086034 A1   Mar. 27, 2014

(51) Int. Cl.
G01B 7/34   (2006.01)
G11B 27/36  (2006.01)
G11B 5/60   (2006.01)

(52) U.S. Cl.
CPC  G01B 7/34 (2013.01); G11B 5/607 (2013.01); G11B 5/6076 (2013.01); G11B 27/36 (2013.01)

(58) Field of Classification Search
CPC .......... G01B 7/34; G01B 11/30; G01B 15/08; G01B 17/08; G01B 21/30
See application file for complete search history.

(56) References Cited

U.S. PATENT DOCUMENTS

| | | | |
|---|---|---|---|
| 5,768,055 A | 6/1998 | Tian et al. | |
| 5,991,113 A | 11/1999 | Meyer et al. | |
| 6,091,557 A | 7/2000 | Hashizume | |
| 6,239,936 B1 | 5/2001 | Abraham et al. | |
| 6,314,814 B1 | 11/2001 | Brannon et al. | |
| 6,504,662 B2 | 1/2003 | Sobey | |
| 7,583,467 B2 | 9/2009 | Lee | |
| 7,626,777 B2 | 12/2009 | Aemireddy et al. | |
| 7,742,255 B2 | 6/2010 | Daugela et al. | |
| 2004/0252392 A1 | 12/2004 | Chua et al. | |
| 2006/0171057 A1 | 8/2006 | Lee | |
| 2008/0072692 A1 | 3/2008 | Uji et al. | |
| 2008/0125989 A1* | 5/2008 | Mavoori | ........... H03F 3/68 702/66 |
| 2008/0192377 A1 | 8/2008 | Lee | |
| 2011/0235208 A1 | 9/2011 | Yang | |

* cited by examiner

Primary Examiner — Paul West
(74) Attorney, Agent, or Firm — HolzerIPLaw, PC

(57) ABSTRACT

The present application discloses detecting an asperity on a storage media surface using two amplitude threshold crossings of an asperity detection signal within a preset timing window. The present application further discloses a temperature-dependent resistive asperity sensor and a preamplifier that correlates a resistance change at the asperity sensor within a preset timing window to detect an asperity on a storage media surface. The asperity may be one or both of a void in the storage media surface and a protrusion from the storage media surface.

20 Claims, 14 Drawing Sheets

STORAGE MEDIA ASPERITY CHARACTERIZATION

BACKGROUND

Data storage media may include one or more surface asperities (e.g., protrusions and/or recesses), where the asperities have a potential to contact one or more microelectronic components on a transducer head (e.g., a read element and a write element) flying in close proximity above the storage media while reading data from and writing data to the storage media. Contact with surface asperities causes wear on the transducer head and reduces its useable life.

Efficient and effective systems and methods for detecting and characterizing surface asperities as protruding or recessed from the storage media surface are useful to reduce head-media contact events and prolong storage media and transducer head life.

SUMMARY

Implementations described and claimed herein address the foregoing problems by providing a method comprising detecting an asperity on a storage media surface using two amplitude threshold crossings of an asperity detection signal within a preset timing window.

Implementations described and claimed herein further address the foregoing problems by providing an asperity detection system comprising a temperature-dependent resistive asperity sensor and a preamplifier that detects an asperity on a storage media surface using a resistance change at the asperity sensor within a preset timing window.

Implementations described and claimed herein still further address the foregoing problems by providing a method comprising passing a transducer head over a storage media surface and detecting an asperity on the storage media surface using a temperature change at an asperity sensor on the transducer head, wherein the temperature change occurs within a preset timing window.

Other implementations are also described and recited herein. These and various other features and advantages will be apparent from a reading of the following detailed description.

DETAILED DESCRIPTIONS

Figure 1:
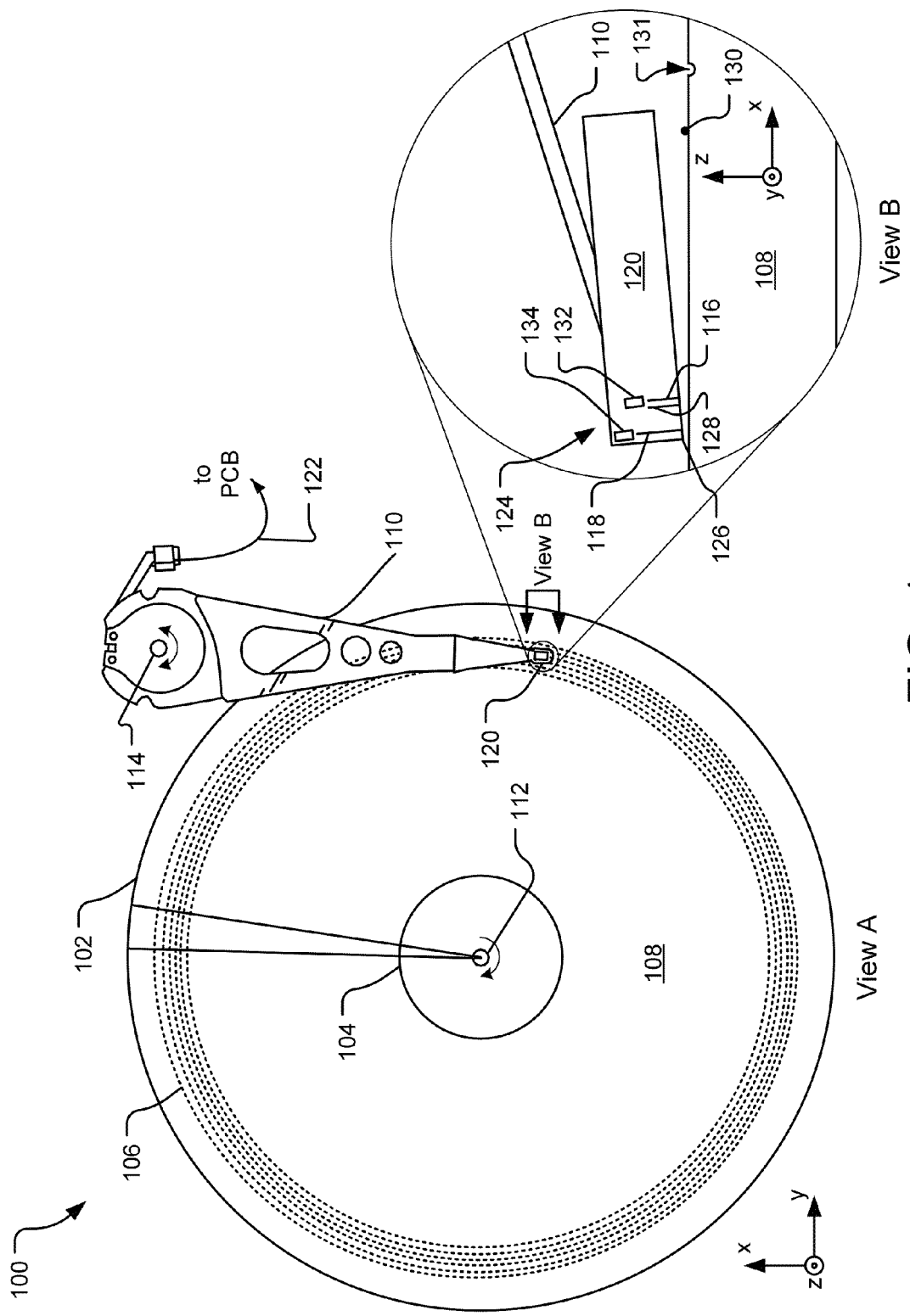
FIG. 1 illustrates an example disc drive assembly including an asperity sensor mounted on a slider located at a distal end of an actuator arm and positioned over a storage media disc.

FIG. 1 illustrates an example disc drive assembly 100 including an asperity sensor 128 created within a slider 120 located at a distal end of an actuator arm 110 and positioned over a storage media disc 108. Referring specifically to View A (x-y plane), the disc 108 includes an outer diameter 102 and an inner diameter 104 between which are a number of substantially circular data tracks (e.g., track 106) illustrated by circular dotted lines. In one implementation, the disc 108 rotates at a high speed about disc axis of rotation 112 as information is written to and read from the data tracks on the disc 108. Further, the disc rotation speed may be fixed or variable.

Information may be written to and read from the disc 108 through the use of an actuator arm 110. The actuator arm 110 rotates about an actuator axis of rotation 114 during a seek operation to located a desired data track and sector on the disc 108. Specific locations on the media disc 108 may defined by any available addressing scheme. Example schemes include cylinder-head-sector (CHS) addressing and logical block addressing (LBA) schemes. The actuator arm 110 extends toward the disc 108 and the slider 120 is located at the distal end of the actuator arm 110. The slider 120 flies in close proximity above the disc 108 while reading and writing data to the disc 108. In other implementations, there is more than one slider 120, actuator arm 110, and/or disc 108 in the disc drive assembly 100.

A flex cable 122 provides the requisite electrical connection paths from a printed circuit board (PCB, not shown) to electronic components attached to the slider 120 (e.g., a read element 116, a write element 118, and the asperity sensor 128) while allowing pivotal movement of the actuator arm 110 during operation. The flex cable 122 may be routed along the actuator arm 110 from the PCB to the slider 120. In one implementation, the flex cable 122 includes circuitry (e.g., a preamplifier (preamp)) for controlling the write currents applied to the write element 118 during a write operation, amplifying read signals generated by the read element 116 during a read operation, and providing asperity detection using the asperity sensor 128, for example. See FIGS. 2A and 2B for details regarding the preamp.

A side view of the slider 120 is shown in detail in View B of the x-z plane of FIG. 1 and includes the read element 116 and a corresponding read element heater 132, the write element 118 and a corresponding write element heater 134, and the asperity sensor 128, all of which are located near a trailing edge 126 of the slider 120. Other microelectronic components may also be mounted near the trailing edge 126 or on other areas of the slider 120. The appearances of the slider 120 and other features of assembly 100 are for illustration purposes only and not drawn to scale. The various microelectronic components attached to the slider 120 may be referred to in total as a transducer head 124.

The disc 108 has a multitude of independent magnetic domains embedded within the disc 108 and the disc 108 generally moves in the negative x-direction with respect to the transducer head 124 in View B. The read element 116 is magneto resistive (i.e., it has a resistance value that varies with magnetic polarity of the magnetic domains of the underlying disc 108 as they pass underneath the read element 116), which allows the read element 116 to read data from the underlying disc 108. The write element 118 generates a magnetic field that changes the magnetic polarity of the magnetic domains of the underlying disc 108 as they pass underneath the write element 118. This allows the write element 118 to write data to the underlying disc 108.

While various efforts are typically made to make the disc 108 as smooth as possible, disc surface irregularities are inevitable at some scale. Here, an asperity 130 protrudes upward from the disc 108 surface. If the asperity 130 height is greater than the fly height of the protruding read element 116, write element 118, or other component of the transducer head 124, the asperity 130 may contact the transducer head 124 and cause damage or wear on one or more components of the transducer head 124. This contact is to be avoided by use of the asperity sensor 128 to detect the presence, location and scale of protruding asperities like asperity 130 on the disc 108 surface.

Asperities are referred to herein as any variations from a planar surface of the disc 108. These variations include defects (e.g., sputtering anomalies) in the disc 108 surface and contaminates located on the disc 108 surface. The asperities include protruding asperities (e.g., the asperity 130), recessed asperities (e.g., void 131), or an area of increased surface roughness (e.g., rapidly changed protrusions and recessions inconsistent with typical surface roughness of the disc 108).

The asperity sensor 128 is made of a material with a resistance that significantly varies with temperature (i.e., a TCR material). In various implementations, the asperity sensor 128 is made of NiFe, Ni, or Cr and has a temperature coefficient of resistance (TCR) of at least 0.002 ohms per degree Celsius. Further, the asperity sensor 128 may be at least two tracks wide and large enough to provide a detectable voltage response that varies with temperature of the asperity sensor 128. Still further, the asperity sensor 128 may have a distinct material composition from the read element 116 and/or the write element 118.

Since cooling/heating effects on the transducer head 124 vary significantly depending on fly height, sudden changes in fly height (e.g., changes caused by the proximity of asperity 130 to the transducer head 124) causes the asperity sensor 128 temperature to increase or decrease from a steady state operating temperature of the asperity sensor 128. Since the asperity sensor 128 has a resistance that significantly varies with temperature, a change in the resistance of the asperity sensor 128 indicates the presence and one or more spatial dimensions of the asperity 130. See discussion below for details regarding use of the asperity sensor 128 to determine particular spatial dimensions of the asperity 130.

The read element heater 132 varies a distance the read element 116 protrudes from the slider 120 toward the disc 108 to fine tune a clearance between the read element 116 and the disc 108. Similarly, the write element heater 134 varies a distance the write element 118 protrudes from the slider 120 toward the disc 108 to fine tune a clearance between the write element 118 and the disc 108. In the implementation depicted in FIG. 1, the asperity sensor 128 is located physically closer to the read element 116 and the corresponding read element heater 132 than the write element 118 and the corresponding write element heater 134. As a result, the read element heater 132 is also used to fine tune a clearance between the asperity sensor 128 and the disc 108.

In other implementations, the asperity sensor 128 may be located closer to the write element heater 134 and the write element heater 134 may be used to fine tune the clearance between the asperity sensor 128 and the disc 108. In yet other implementations, the asperity sensor 128 may have a dedicated heater that fine tunes the clearance between the asperity sensor 128 and the disc 108.

The presently disclosed technology may apply to storage drive assemblies other than the disc drive assembly 100 depicted in FIG. 1. Further, the presently disclosed technology may be used to detect asperities on planar surfaces other than storage media.

Figure 2A:
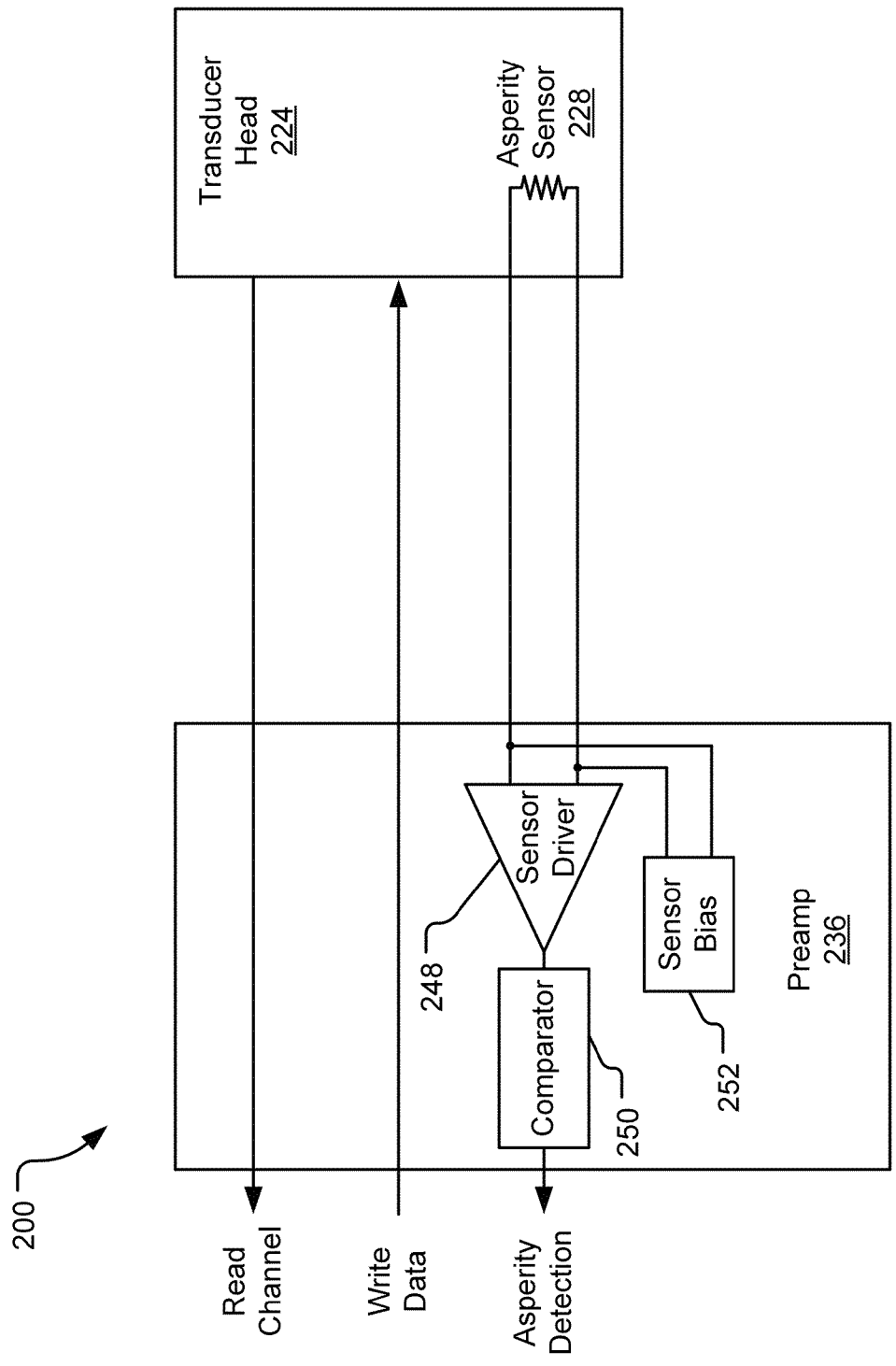
FIG. 2A illustrates a first example circuit diagram for an asperity detection system.

FIG. 2A illustrates a first example circuit diagram for an asperity detection system. The system 200 includes a transducer head 224 and a preamp 236. The transducer head 224 flies in close proximity above a storage media surface (not shown) as data is read from the storage media (e.g., via a real channel), as data is written to the storage media, and as one or more asperities on the storage media surface are detected using an asperity sensor 228.

The preamp 236 includes a sensor bias generator 252, a sensor driver 248, and a sensor comparator 250. Cooling/heating effects on the transducer head 224 vary significantly depending on fly height, sudden changes in fly height (e.g., changes caused by the proximity of an asperity to the transducer head 224) causes the asperity sensor 228 to heat or cool depending on whether the asperity protrudes or is recessed from the storage media surface. Since the asperity sensor 228 is made of a material with a resistance that significantly varies with temperature, a change in the resistance of the asperity sensor 228 indicates the presence and one or more dimensions of an asperity and whether the asperity protrudes or is recessed from the storage media surface.

The sensor bias generator 252 applies a bias voltage across the asperity sensor 228 to detect changes in resistive value of the asperity sensor 228 in terms of a differential voltage change. The sensor driver 248 receives the biased voltage change across the asperity sensor 228 and outputs a voltage with variations in amplitude that correspond to changes in resistance of the asperity sensor 228 over time. Further, the sensor driver 248 may condition the output voltage by applying a gain factor to boost the output signal and/or applying a band-pass filter to filter out noise in the output voltage that does not correspond to changes in resistance of the asperity sensor 228 over time. In one implementation, the gain factor ranges from approximately 25 to 48 decibels and the band pass filter ranges from 500 kHz to 30 MHz.

The conditioned output voltage waveform is sent to a comparator 250, which compares the voltage of the waveform to one or more thresholds, where exceeding the threshold suggests the presence of an asperity and the polarity of the response suggests the type of asperity detected (e.g., a protrusion or a void). Material composition of the storage media, media lube (not shown), media velocity, and fly height all influence the response of the asperity sensor 228. Baseline noise is a positive voltage setting and a negative voltage setting at the sensor comparator 250 that continually exceeds background noise using bias voltage, gain, and/or filter settings applied by the sensor bias generator 252, the sensor driver 248, and/or the sensor comparator 250. The filter settings, gain factors, and/or detection thresholds for the asperity sensor 228 may be calibrated during commissioning of a storage drive to account for storage drive baseline noise specific to a particular installation of the asperity sensor 228. When the comparator 250 detects the presence of an asperity, a signal is output indicating the presence and one or more detected dimensions of the asperity.

In some implementations, discriminating between protruding asperities and recessed asperities requires timing window analysis of the output voltage waveform. Recessed asperities typically create an initial positive voltage response due to heating as spacing between the transducer head 224 and the media increases, which in turn causes reduced cooling at the air-bearing surface (ABS). Further, protruding asperities typically create an initial negative response due to sudden increased cooling prior to contact with the protruding asperity. The increased cooling is caused by compressed airflow between the transducer head 224 and the ABS, which in turn is caused by decreased spacing between the transducer head 224 and the ABS.

However, the output voltage waveform may have undershoot and/or overshoot features due to filter effects in the preamp 236. The undershoot and/or overshoot or impact may trip thresholds on the output voltage waveform and falsely indicate the presence of an asperity or falsely whether the asperity is protruding or recessed. More specifically, when using a negative threshold within the preamp 236 to detect protruding asperities, the undershoot of a recessed asperity may trip the negative threshold. Similarly, when using a positive threshold within the preamp 236 to detect recessed asperities, the overshoot of a protruding asperity may trip the positive threshold. As a result, what appears to be a protruding asperity and may be mapped as a protruding asperity may not actually be a protruding asperity without timing window analysis of the output voltage waveform. Similarly, what appears to be a recessed asperity and may be mapped as a recessed asperity may not actually be a recessed asperity without timing window analysis of the output voltage waveform (i.e., an asperity detection signal).

Further, heating caused by impact of the transducer head 224 with a protruding asperity may be misinterpreted as heating due to increased spacing between the transducer head 224 with the protruding asperity. The impact may trip thresholds on the output voltage waveform and falsely indicate that the protruding asperity is recessed. Timing window analysis of the output voltage waveform may also be used to reduce false characterization of protruding asperities and recessed.

In one implementation, an initial threshold crossing feature may be enabled at the preamp that detects not only the crossing of an amplitude threshold of the output voltage waveform, but whether the crossing is an initial threshold crossing, the magnitude direction of the crossing (e.g., increasing in magnitude or decreasing in magnitude), and the polarity of the crossing. A timing window on the voltage output voltage waveform restarts the initial threshold crossing feature. Additional threshold crossings within the timing window are not initial threshold crossings. These are referred to herein as subsequent threshold crossings.

In one implementation, the preamp adds one bit (i.e., an asperity detection bit) to the read-back signal corresponding to an initial crossing of the threshold and the polarity of the crossing (e.g., a "0" when the initial crossing is at a negative magnitude and a "1" when the initial crossing is at a positive magnitude, or vice versa). The preamp latches the state of this bit when a fault occurs and unlatches the bit when the fault is cleared. When the fault is cleared, the asperity detection bit is no longer used. Further, the polarity of the asperity detection bit may be cleared back to "0" or the existing value may be left in place when the fault is cleared. Additional analysis of the asperity detection bit may be performed away from the preamp to determine whether the asperity detection bit indicates a protruding asperity, a recessed asperity, or no asperity. This additional analysis may be done manually or in code.

In another implementation, the preamp adds two additional bits (i.e., an enabling bit and an asperity type bit). The enabling bit indicates whether the asperity discriminator is enabled or disabled (e.g., a "0" indicates that asperity discriminator is disabled and a "1" indicates that asperity discriminator is enabled, or vice versa). The asperity type bit indicates whether the preamp is directed to detect protruding asperities or recessed asperities (e.g., a "0" indicates that the preamp is directed to detect protruding asperities and a "1" indicates that the preamp is directed to detect recessed asperities, or vice versa). In this implementation, the state of the asperity type bit is not latched, but instead updated continuously.

A timing window defines whether a detected threshold crossing is an initial crossing or a subsequent crossing. A valid detected threshold crossing triggers the start of the timing window. All subsequent crossings within the timing window are characterized as subsequent crossings. Once the timing window expires, the next valid detected threshold crossing is an initial threshold crossing, and so on. Example implementations of the initial threshold crossing feature and timing window are discussed in detail with respect to FIGS. 3-9 below. Example timing windows include 1.0 µs, 1.5 µs, 2.0 µs, and 2.5 µs. In one implementation, disc rotation speed and/or an expected ranged of asperity sizes defines the timing window duration.

The comparator 250 output may be further analyzed to pinpoint the position and one or more dimensions of a detected asperity. In an example implementation, height of a protruding asperity is determined by looping through a series of transducer head fly heights (e.g., ranging from a maximum fly height to target read clearance) using a voltage threshold above baseline noise. The height of the asperity corresponds to the maximum fly height where the asperity is detected. Further, width of the asperity may be defined as the number of adjacent tracks where the asperity is detected. Still further, a length of the asperity may be detected via the read channel. Components of the transducer head 224 and the preamp 236 that are used for asperity detection and characterization are referred to herein as an asperity discriminator.

Figure 2B:
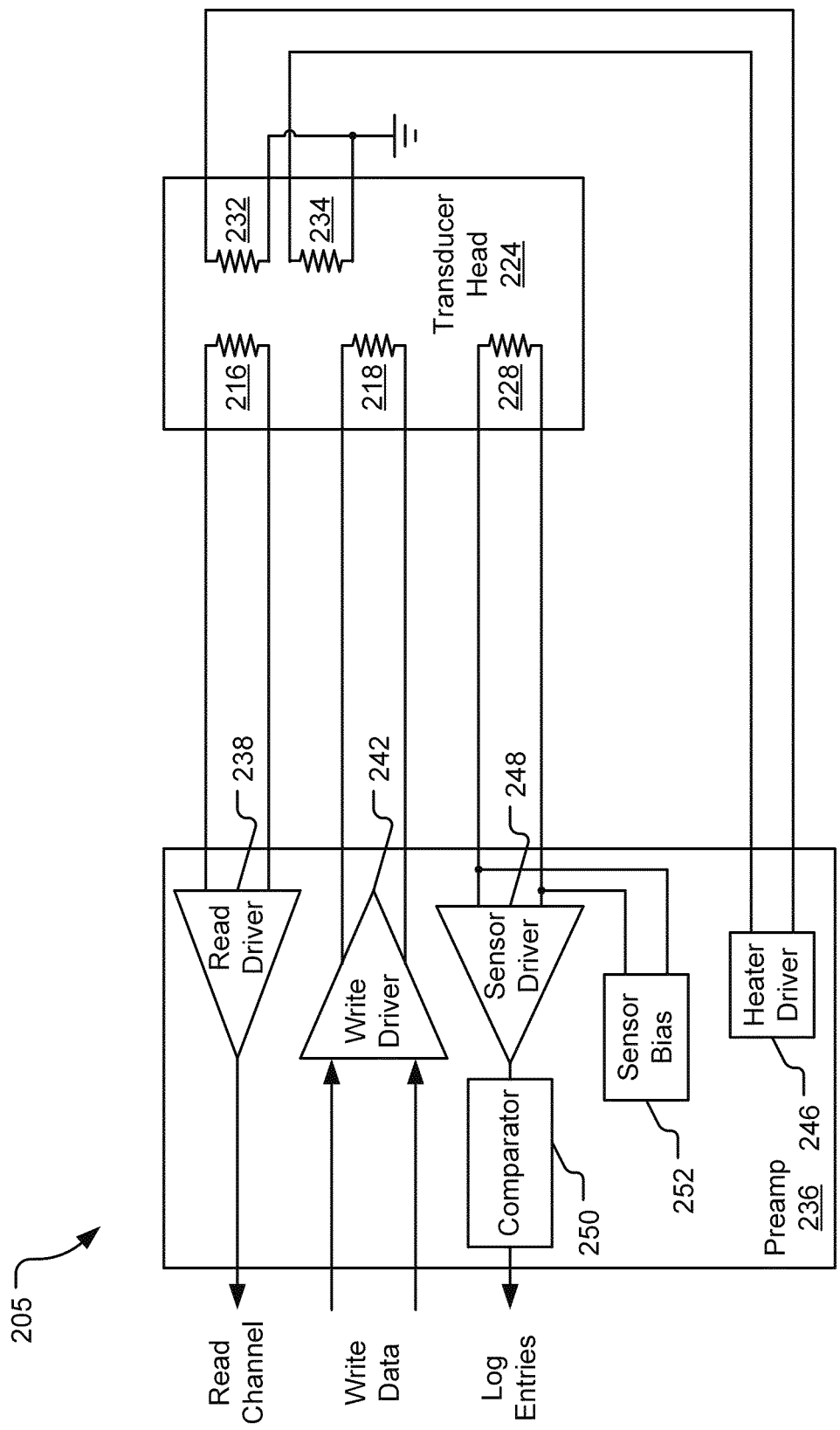
FIG. 2B illustrates a second example circuit diagram for an asperity detection system.

FIG. 2B illustrates an example circuit diagram for an asperity detection system 205. The system 205 includes a transducer head 224 and a preamp 236. The transducer head 224 includes a read element 216 and a corresponding read element heater 232, a write element 218 and a corresponding write element heater 234, and an asperity sensor 228. The transducer head 224 flies in close proximity above a storage media surface (not shown) as data is read from the storage media using the read element 216, as data is written to the storage media using the write element 218, and as one or more asperities on the storage media surface are detected using the asperity sensor 228.

The preamplifier 236 includes a read driver 238, a write driver 242, and a heater driver 246. The read driver 238 processes a read signal received from the read element 216 and sends the read signal out to a read channel. The write driver 238 processes incoming write data that is then sent to the write element 218 for inclusion on the storage media. The heater driver 246 sends power to one or both of the read element heater 232 and the write element heater 234 to fine tune the fly height of the read element 216, the write element 218 and/or the asperity sensor 228.

The preamp 236 further includes a sensor bias generator 252, a sensor driver 248, and a sensor comparator 250. Cooling/heating effects on the transducer head 224 vary significantly depending on fly height, sudden changes in fly height (e.g., changes caused by the proximity of an asperity to the transducer head 224) causes the asperity sensor 228 to heat or cool depending on whether the asperity protrudes or is recessed from the storage media surface. Since the asperity sensor 228 is made of a material with a resistance that significantly varies with temperature, a change in the resistance of the asperity sensor 228 indicates the presence and one or more dimensions of an asperity and whether the asperity protrudes or is recessed from the storage media surface.

The sensor bias generator 252 applies a bias voltage across the asperity sensor 228 to detect changes in resistive value of the asperity sensor 228 in terms of a differential voltage change. The sensor driver 248 receives the biased voltage change across the asperity sensor 228 and outputs a voltage with variations in amplitude that correspond to changes in resistance of the asperity sensor 228 over time. Further, the sensor driver 248 may condition the output voltage by applying a gain factor to boost the output signal and/or applying a band-pass filter to filter out noise in the output voltage that does not correspond to changes in resistance of the asperity sensor 228 over time. In one implementation, the gain factor ranges from approximately 25 to 48 decibels and the band pass filter ranges from 500 kHz to 30 MHz.

The conditioned output voltage waveform is sent to a comparator 250, which compares the voltage of the waveform to one or more thresholds, where exceeding the threshold suggests the presence of an asperity and the polarity of the response suggests the type of asperity detected (e.g., a protrusion or a void). Material composition of the storage media, media lube (not shown), media velocity, and fly height all influence the response of the asperity sensor 228. Baseline noise is a positive voltage setting and a negative voltage setting at the sensor comparator 250 that continually exceeds background noise using bias voltage, gain, and/or filter settings applied by the sensor bias generator 252, the sensor driver 248, and/or the sensor comparator 250. The filter settings, gain factors, and/or detection thresholds for the asperity sensor 228 may be calibrated during commissioning of a storage drive to account for storage drive baseline noise specific to a particular installation of the asperity sensor 228.

When the comparator 250 detects the presence of an asperity, a signal is output indicating the presence and one or more detected dimensions of the asperity. The location on the storage media and heater power output when the asperity was detected is recorded in a log.

In some implementations, discriminating between protruding asperities and recessed asperities requires timing window analysis of the output voltage waveform. Recessed asperities typically create an initial positive voltage response due to heating as spacing between the transducer head 224 and the media increases, which in turn causes reduced cooling at the air-bearing surface (ABS). Further, protruding asperities typically create an initial negative response due to sudden increased cooling prior to contact with the protruding asperity. The increased cooling is caused by compressed airflow between the transducer head 224 and the ABS, which in turn is caused by decreased spacing between the transducer head 224 and the ABS.

However, the output voltage waveform may have undershoot and/or overshoot features due to filter effects in the preamp 236. The undershoot and/or overshoot or impact may trip thresholds on the output voltage waveform and falsely indicate the presence of an asperity or falsely whether the asperity is protruding or recessed. More specifically, when using a negative threshold within the preamp 236 to detect protruding asperities, the undershoot of a recessed asperity may trip the negative threshold. Similarly, when using a positive threshold within the preamp 236 to detect recessed asperities, the overshoot of a protruding asperity may trip the positive threshold. As a result, what appears to be a protruding asperity and may be mapped as a protruding asperity may not actually be a protruding asperity without timing window analysis of the output voltage waveform. Similarly, what appears to be a recessed asperity and may be mapped as a recessed asperity may not actually be a recessed asperity without timing window analysis of the output voltage waveform (i.e., an asperity detection signal).

Further, heating caused by impact of the transducer head 224 with a protruding asperity may be misinterpreted as heating due to increased spacing between the transducer head 224 with the protruding asperity. The impact may trip thresholds on the output voltage waveform and falsely indicate that the protruding asperity is recessed. Timing window analysis of the output voltage waveform may also be used to reduce false characterization of protruding asperities and recessed.

In one implementation, an initial threshold crossing feature may be enabled at the preamp that detects not only the crossing of an amplitude threshold of the output voltage waveform, but whether the crossing is an initial threshold crossing, the magnitude direction of the crossing (e.g., increasing in magnitude or decreasing in magnitude), and the polarity of the crossing. A timing window on the voltage output voltage waveform restarts the initial threshold crossing feature. Additional threshold crossings within the timing window are not initial threshold crossings. These are referred to herein as subsequent threshold crossings.

In one implementation, the preamp adds one bit (i.e., an asperity detection bit) to the read-back signal corresponding to an initial crossing of the threshold and the polarity of the crossing (e.g., a "0" when the initial crossing is at a negative magnitude and a "1" when the initial crossing is at a positive magnitude, or vice versa). The preamp latches the state of this bit when a fault occurs and unlatches the bit when the fault is cleared. When the fault is cleared, the asperity detection bit is no longer used. Further, the polarity of the asperity detection bit may be cleared back to "0" or the existing value may be left in place when the fault is cleared. Additional analysis of the asperity detection bit may be performed away from the preamp to determine whether the asperity detection bit indicates a protruding asperity, a recessed asperity, or no asperity. This additional analysis may be done manually or in code.

In another implementation, the preamp adds two additional bits (i.e., an enabling bit and an asperity type bit). The enabling bit indicates whether the asperity discriminator is enabled or disabled (e.g., a "0" indicates that asperity discriminator is disabled and a "1" indicates that asperity discriminator is enabled, or vice versa). The asperity type bit indicates whether the preamp is directed to detect protruding asperities or recessed asperities (e.g., a "0" indicates that the preamp is directed to detect protruding asperities and a "1" indicates that the preamp is directed to detect recessed asperities, or vice versa). In this implementation, the state of the asperity type bit is not latched, but instead updated continuously.

A timing window defines whether a detected threshold crossing is an initial crossing or a subsequent crossing. A valid detected threshold crossing triggers the start of the timing window. All subsequent crossings within the timing window are characterized as subsequent crossings. Once the timing window expires, the next valid detected threshold crossing is an initial threshold crossing, and so on. Example implementations of the initial threshold crossing feature and timing window are discussed in detail with respect to FIGS. 3-9 below. Example timing windows include 1.0 µs, 1.5 µs, 2.0 µs, and 2.5 µs. In one implementation, disc rotation speed and/or an expected ranged of asperity sizes defines the timing window duration.

The logged comparator 250 output may be further analyzed to pinpoint the position and one or more dimensions of a detected asperity. In an example implementation, height of a protruding asperity is determined by looping through a series of transducer head fly heights (e.g., ranging from a maximum fly height to target read clearance) using a voltage threshold above baseline noise. The height of the asperity corresponds to the maximum fly height where the asperity is detected. Further, width of the asperity may be defined as the number of adjacent tracks where the asperity is detected. Still further, a length of the asperity may be detected by a read element 216. Components of the transducer head 224 and the preamp 236 that are used for asperity detection and characterization are referred to herein as an asperity discriminator.

Figure 3:
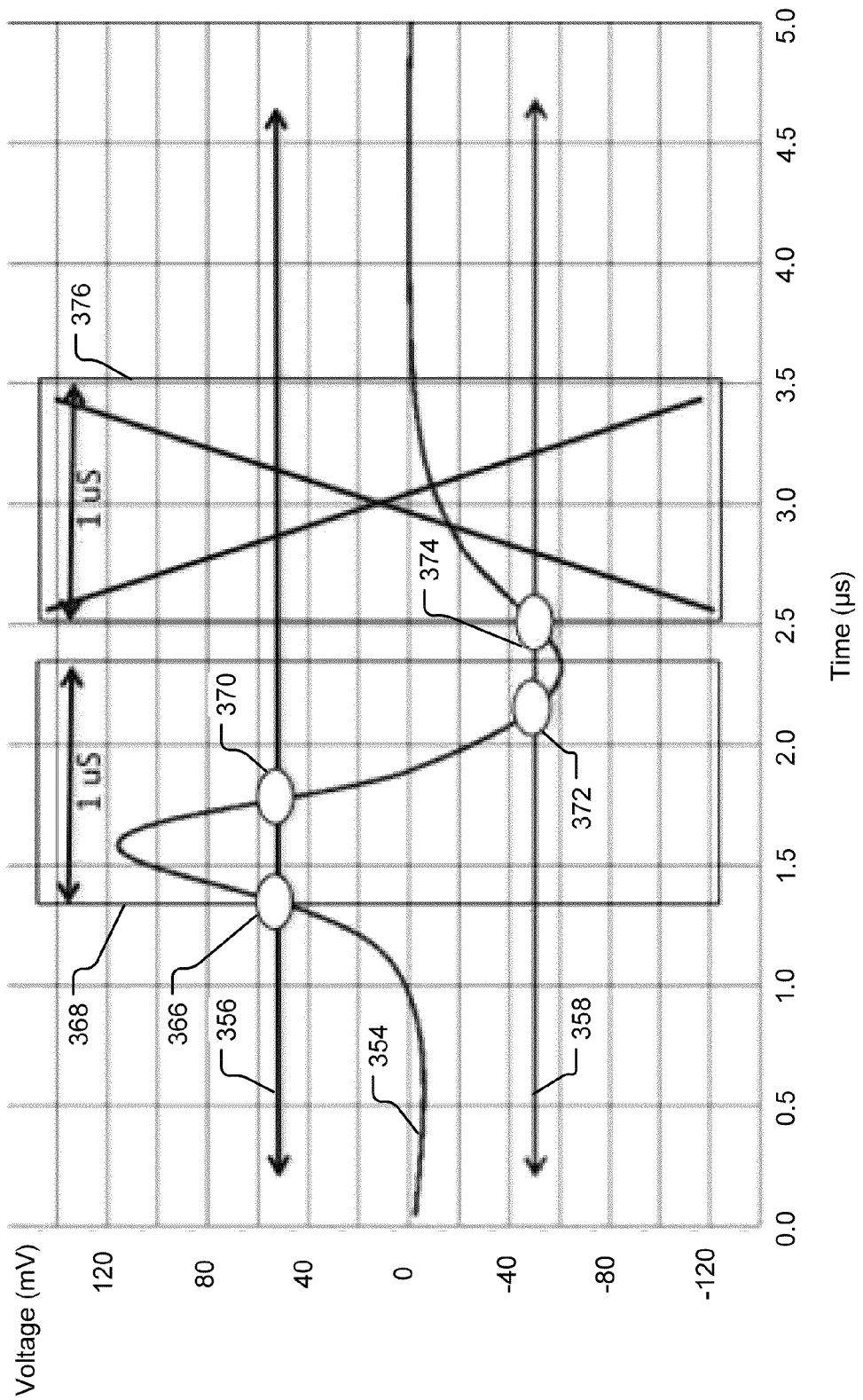
FIG. 3 illustrates a voltage response of an example asperity sensor with a 1.0 µs detection window setting and no asperities detected.

FIG. 3 illustrates a voltage response 354 of an example asperity sensor (not shown) with a 1.0 µs detection window setting and no asperities detected. The voltage response 354 is a plot of AC-coupled differential voltage across the asperity sensor, which corresponds to temperature changes at the asperity sensor over time. More specifically, as temperature drops at the asperity sensor, the resistance of the asperity sensor drops, and thus the differential voltage across the asperity sensor increases with a negative polarity. Similarly, as the temperature rises at the asperity sensor, the resistance of the asperity sensor rises, and thus the differential voltage across the asperity sensor increases with a positive polarity.

In some implementations, the voltage response 354 is normalized, amplified, and/or filtered (see e.g., sensor driver 248 of FIGS. 2A and 2B) to emphasize voltage changes that correspond to temperature changes at the asperity sensor over time. The voltage response 354 may have undershoot and/or overshoot features due to filter effects in a preamp (not shown), which may yield false detection of asperities if the 1.0 µs detection window is not utilized.

In the implementation shown in FIG. 3, the voltage response 354 is normalized to approximately 0 volts when no asperities are present. In other implementations, the voltage response 354 may be normalized to any convenient magnitude with a positive or negative polarity. A positive threshold 356 is set at about 50 mV and a negative threshold 358 is set at −50 mV to indicate the presence of an asperity. Variations in the voltage response 354 that do not exceed the thresholds 356, 358 indicate baseline noise or asperities with small enough dimensions that they are ignored. The thresholds 356, 358 may be set at any value and may be adjusted in real time to calibrate the minimum size of detected asperities. For example, the thresholds 356, 358 may be set at a value that detects asperities that protrude greater than 6 nm from the storage media 308 surface. In one implementation, the preamp is capable of detecting voltages ranging from 1-200 mV. Thus, the thresholds 356, 358 may be set at magnitudes less than +200 mV and −200 mV when using such a preamp.

In an example implementation, voltage response 354 is used only for detecting protruding asperities. Voltage response 354 first exceeds the positive threshold 356 at about 1.3 µs at point 366. This is an initial crossing and is increasing in magnitude. This indicates the presence of a possible recessed asperity and triggers the start of timing window 368, which is preconfigured as 1.0 µs in duration. The voltage response 354 drops below the positive threshold 356 at about 1.7 µs at point 370 and drops below the negative threshold 358 at about 2.1 µs at point 372. Since the timing window 368 corresponds to a possible recessed asperity and voltage response 354 is used only for detecting protruding asperities, points 366, 370, 372 are ignored.

After the expiration of the timing window 368, the voltage response 354 next crosses a threshold (i.e., the negative threshold 356) at about 2.5 µs at point 374. Normally, the threshold crossing at point 374 would trigger a new timing window 376. However, since the crossing at point 374 is decreasing in magnitude, it is ignored (as illustrated by the "X" through timing window 376.

In one implementation, an asperity detection bit is set at "1" throughout the 0.0 µs-5.0 µs timeframe because the only initial crossing was positive and increasing in magnitude. An enabling bit is set at "1," which indicates that asperity discriminator is enabled. An asperity type bit is set at "0," which indicates that the preamp is directed to detect protruding asperities only. Since neither of the timing windows 368, 376 indicate the presence of a protruding asperity, no fault is output for the depicted 0.0 µs-5.0 µs timeframe.

In another implementation, the voltage response 354 may be used to detect recessed asperities only. If a user wishes to detect recessed asperities, the user will then set the asperity type bit to "1." Since a positive threshold crossing occurs at point 366 and the crossing is increasing in magnitude, a fault is posted to the fault pin for the time duration between point 366 and point 370. All other threshold crossings are ignored (e.g., at point 372) within the timing window 368. The crossing at point 374 is decreasing in magnitude and therefore ignored (as illustrated by the "X" through timing window 376). In yet another implementation, the voltage response 354 may be used to detect recessed asperities and protruding asperities simultaneously. For example, the voltage response 354 may be used to generate two fault line bits, one corresponding to recessed asperities and one corresponding to protruding asperities.

Figure 4:
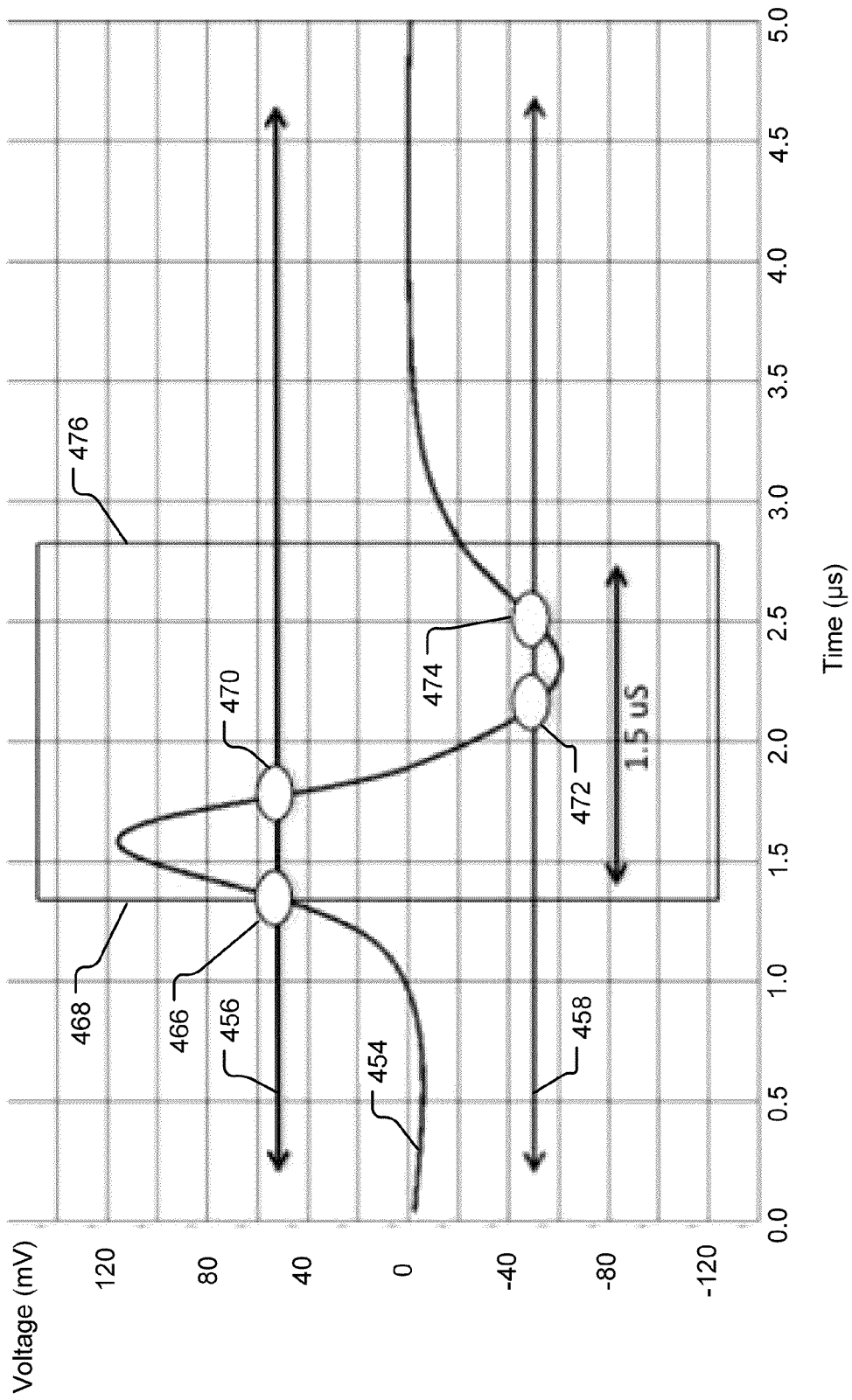
FIG. 4 illustrates a voltage response of an example asperity sensor with a 1.5 µs detection window setting and no asperities detected.

FIG. 4 illustrates a voltage response 454 of an example asperity sensor (not shown) with a 1.5 µs detection window setting and no asperities detected. The voltage response 454 is a plot of AC-coupled differential voltage across the asperity sensor, which corresponds to temperature changes at the asperity sensor over time. The voltage response 454 may have undershoot and/or overshoot features due to filter effects in a preamp (not shown), which may yield false detection of asperities if the 1.5 µs detection window is not utilized.

The voltage response 454 is normalized to approximately 0 volts when no asperities are present. A positive threshold 456 is set at about 50 mV and a negative threshold 458 is set at −50 mV to indicate the presence of an asperity. Variations in the voltage response 454 that do not exceed the thresholds 456, 458 indicate baseline noise or asperities with small enough dimensions that they are ignored.

In an example implementation, voltage response 454 is used only for detecting protruding asperities. Voltage response 454 first exceeds the positive threshold 456 at about 1.3 µs at point 466. This is an initial crossing and is increasing in magnitude. This indicates the presence of a possible recessed asperity and triggers the start of timing window 468, which is preconfigured as 1.5 µs in duration. The voltage response 454 drops below the positive threshold 456 at about 1.7 µs at point 470, drops below the negative threshold 458 at about 2.1 µs at point 472, and rises back above negative threshold 456 at about 2.5 µs at point 474. Since the timing window 468 corresponds to a possible recessed asperity and voltage response 454 is used only for detecting protruding asperities, points 466, 470, 472, 474 are ignored.

In one implementation, an asperity detection bit is set at "1" throughout the 0.0 µs-5.0 µs timeframe because the only initial crossing was positive and increasing in magnitude. An enabling bit is set at "1," which indicates that asperity discriminator is enabled. An asperity type bit is set at "0," which indicates that the preamp is directed to detect protruding asperities only. Since the timing window 468 does not indicate the presence of a protruding asperity, no fault is output for the depicted 0.0 µs-5.0 µs timeframe.

In another implementation, the voltage response 454 may be used to detect recessed asperities only. If a user wishes to detect recessed asperities, the user will then set the asperity type bit to "1." Since a positive threshold crossing occurs at point 466 and the crossing is increasing in magnitude, a fault is posted to the fault pin for the time duration between point 466 and point 470. All other threshold crossings are ignored (e.g., at points 472, 474) within the timing window 468. In yet another implementation, the voltage response 454 may be used to detect recessed asperities and protruding asperities simultaneously. For example, the voltage response 454 may be used to generate two fault line bits, one corresponding to recessed asperities and one corresponding to protruding asperities.

Figure 5:
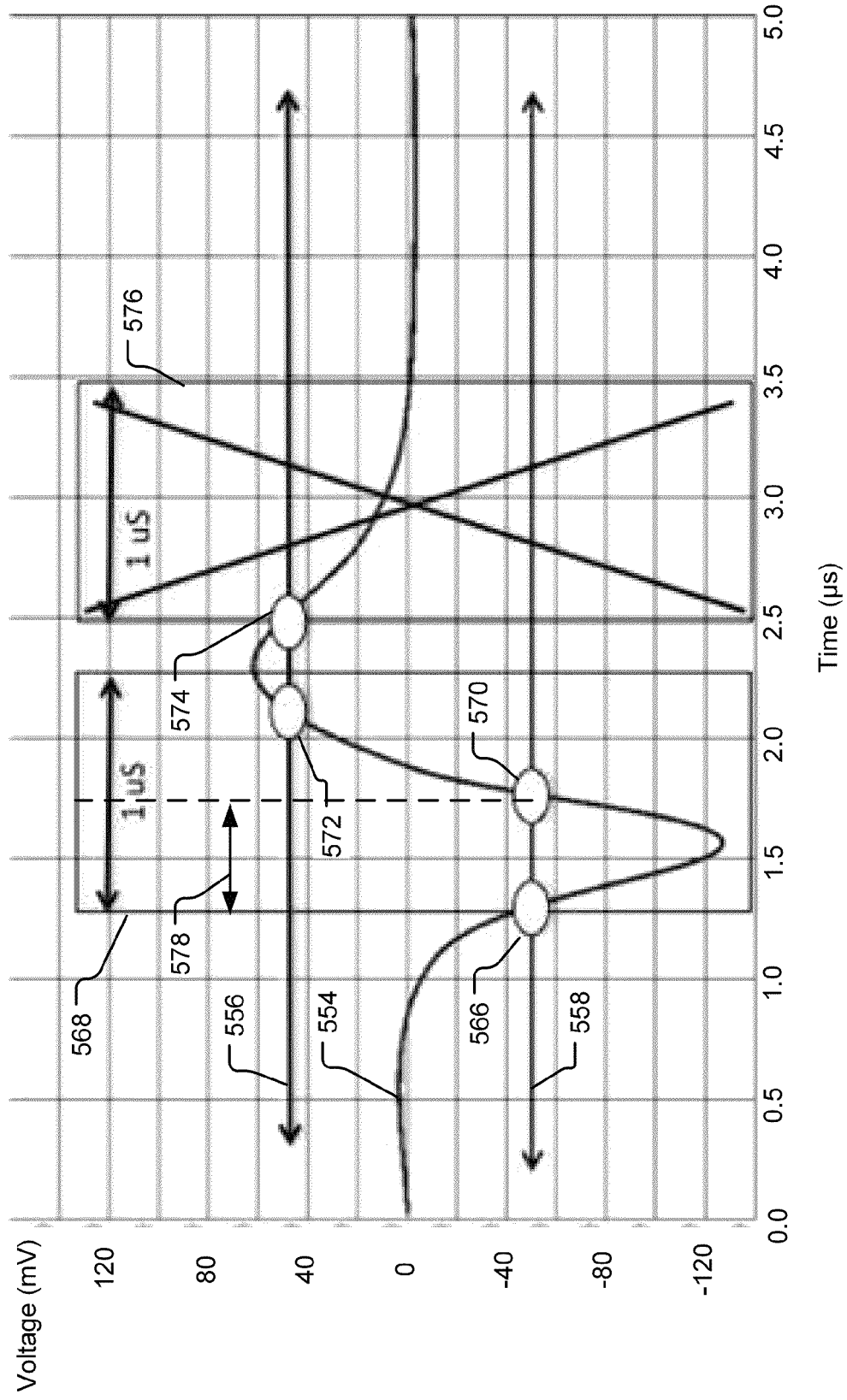
FIG. 5 illustrates a voltage response of an example asperity sensor with a 1.0 µs detection window setting and one protruding asperity detected.

FIG. 5 illustrates a voltage response 554 of an example asperity sensor (not shown) with a 1.0 µs detection window setting and one protruding asperity detected. The voltage response 554 is a plot of AC-coupled differential voltage across the asperity sensor, which corresponds to temperature changes at the asperity sensor over time. The voltage response 554 may have undershoot and/or overshoot features due to filter effects in a preamp (not shown), which may yield false detection of asperities if the 1.0 µs detection window is not utilized.

The voltage response 554 is normalized to approximately 0 volts when no asperities are present. A positive threshold 556 is set at about 50 mV and a negative threshold 558 is set at −50 mV to indicate the presence of an asperity. Variations in the voltage response 554 that do not exceed the thresholds 556, 558 indicate baseline noise or asperities with small enough dimensions that they are ignored.

In an example implementation, voltage response 554 is used only for detecting protruding asperities. Voltage response 554 first exceeds the negative threshold 558 at about 1.3 µs at point 566. This is an initial crossing and is increasing in magnitude. This indicates the presence of a protruding asperity and triggers the start of timing window 568, which is preconfigured as 1.0 µs in duration.

The voltage response 554 rises above the negative threshold 558 at about 1.7 µs at point 570. This indicates a protruding asperity between point 566 and point 570 and a fault is output for about the 1.3 µs-1.7 µs timeframe (see arrow 578). The voltage response continues to rise above the positive threshold 556 at about 2.1 µs at point 572. This point is ignored because it is within the timing window 568.

After the expiration of the timing window 568, the voltage response 554 next crosses a threshold (i.e., the positive threshold 556) at about 2.5 µs at point 574. Normally, the threshold crossing at point 374 would trigger a new timing window 376. However, since the crossing at point 574 is decreasing in magnitude, it is ignored (as illustrated by the "X" through timing window 576).

In one implementation, an asperity detection bit is set at "0" throughout the 0.0 µs-5.0 µs timeframe because the only detected fault is a protruding asperity. An enabling bit is set at "1," which indicates that asperity discriminator is enabled. An asperity type bit is set at "0," which indicates that the preamp is directed to detect protruding asperities only. A fault is output for about the 1.3 µs-1.7 µs timeframe (see arrow 578).

In another implementation, the voltage response 554 may be used to detect recessed asperities only. If a user wishes to detect recessed asperities, the user will then set the asperity type bit to "1." Since the timing window 568 corresponds to a possible protruding asperity and voltage response 554 is used only for detecting recessed asperities, points 566, 570, 572 are ignored. The crossing at point 574 is decreasing in magnitude and therefore ignored as well (as illustrated by the "X" through timing window 576). No faults are output. In yet another implementation, the voltage response 554 may be used to detect recessed asperities and protruding asperities simultaneously. For example, the voltage response 554 may be used to generate two fault line bits, one corresponding to recessed asperities and one corresponding to protruding asperities.

Figure 6:
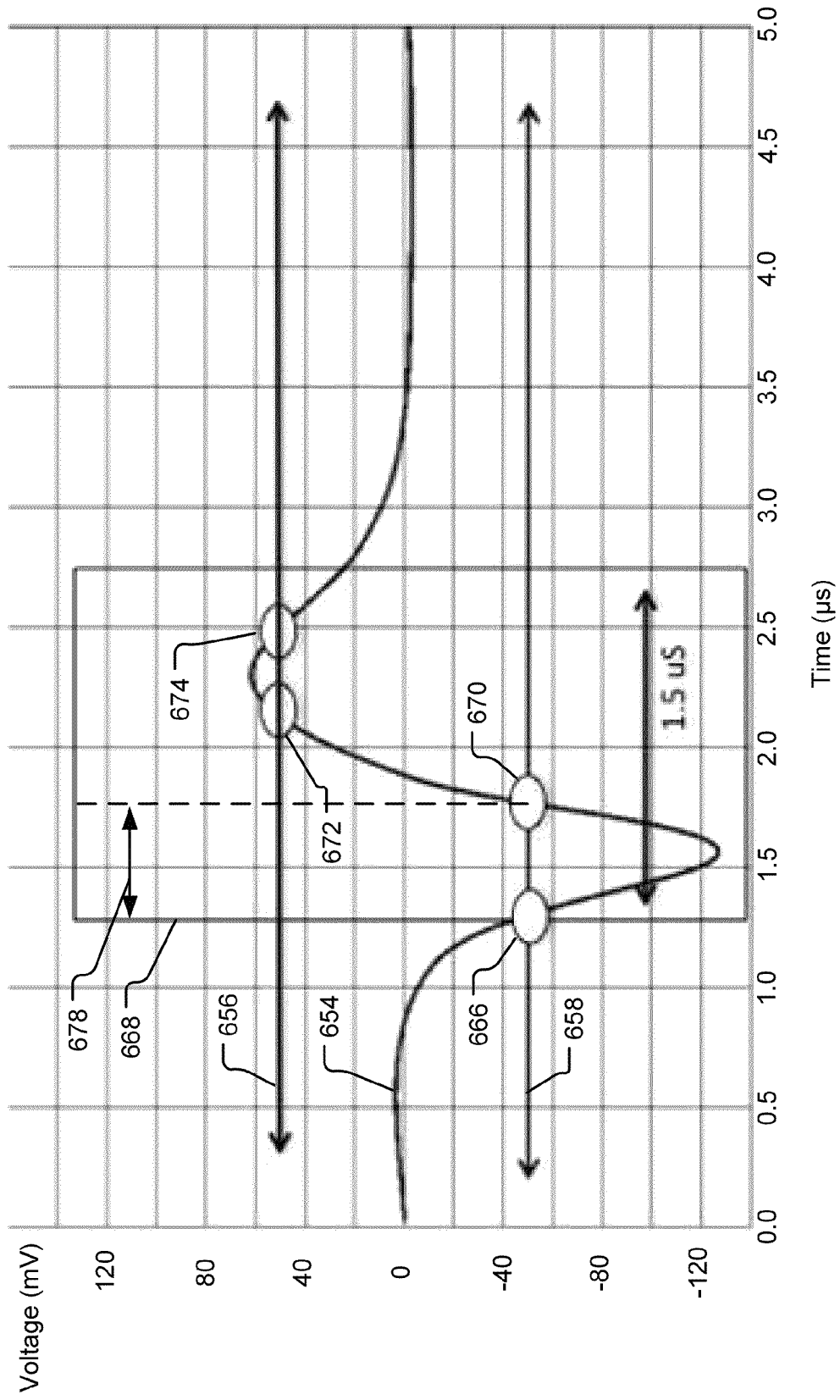
FIG. 6 illustrates a voltage response of an example asperity sensor with a 1.5 µs detection window setting and one protruding asperity detected.

FIG. 6 illustrates a voltage response 654 of an example asperity sensor (not shown) with a 1.5 µs detection window setting and one protruding asperity detected. The voltage response 654 is a plot of AC-coupled differential voltage across the asperity sensor, which corresponds to temperature changes at the asperity sensor over time. The voltage response 654 may have undershoot and/or overshoot features due to filter effects in a preamp (not shown), which may yield false detection of asperities if the 1.5 µs detection window is not utilized.

The voltage response 654 is normalized to approximately 0 volts when no asperities are present. A positive threshold 656 is set at about 50 mV and a negative threshold 658 is set at −50 mV to indicate the presence of an asperity. Variations in the voltage response 654 that do not exceed the thresholds 656, 658 indicate baseline noise or asperities with small enough dimensions that they are ignored.

In an example implementation, voltage response 654 is used only for detecting protruding asperities. Voltage response 654 first exceeds the negative threshold 658 at about 1.3 µs at point 666. This is an initial crossing and is increasing in magnitude. This indicates the presence of a protruding asperity and triggers the start of timing window 668, which is preconfigured as 1.5 µs in duration. The voltage response 654 rises above the negative threshold 658 at about 1.7 µs at point 670. This indicates a protruding asperity between point 666 and point 670 and a fault is output for about the 1.3 µs-1.7 µs timeframe (see arrow 678).

The voltage response continues to rise above the positive threshold 656 at about 2.1 µs at point 672 and fall below the positive threshold 656 at about 2.5 µs at point 674. These points are ignored because they are within the timing window 668.

In one implementation, an asperity detection bit is set at "0" throughout the 0.0 µs-5.0 µs timeframe because the only detected fault is a protruding asperity. An enabling bit is set at "1," which indicates that asperity discriminator is enabled. An asperity type bit is set at "0," which indicates that the preamp is directed to detect protruding asperities only. A fault is output for about the 1.3 µs-1.7 µs timeframe (see arrow 678).

In another implementation, the voltage response 654 may be used to detect recessed asperities only. If a user wishes to detect recessed asperities, the user will then set the asperity type bit to "1." Since the timing window 668 corresponds to a possible protruding asperity and voltage response 654 is used only for detecting recessed asperities, points 666, 670, 672, 674 are ignored and no faults are output. In yet another implementation, the voltage response 654 may be used to detect recessed asperities and protruding asperities simultaneously. For example, the voltage response 654 may be used to generate two fault line bits, one corresponding to recessed asperities and one corresponding to protruding asperities.

Figure 7:
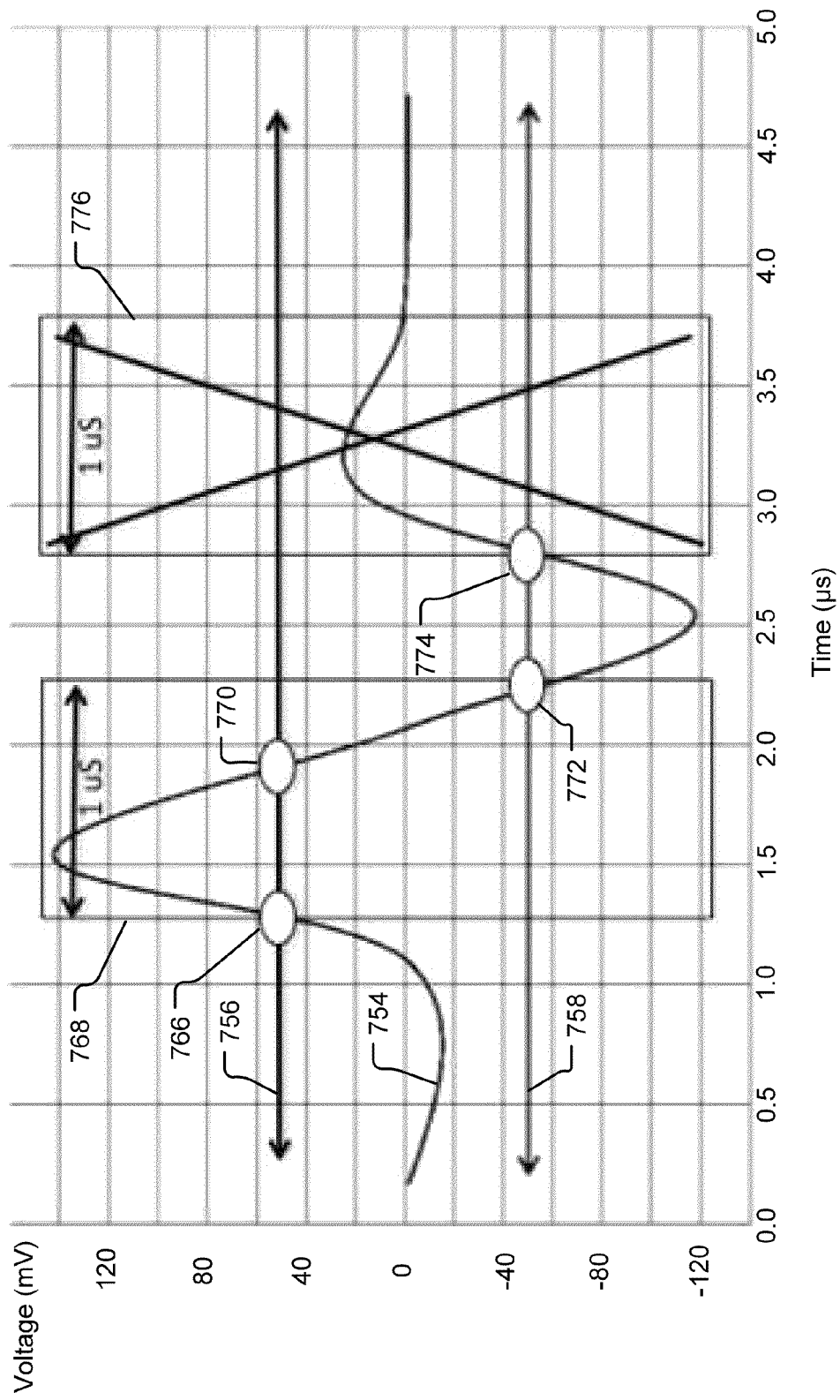
FIG. 7 illustrates a voltage response of an example asperity sensor with a 1.0 µs detection window setting and no asperities detected.

FIG. 7 illustrates a voltage response 754 of an example asperity sensor (not shown) with a 1.0 µs detection window setting and no asperities detected. The voltage response 754 is a plot of AC-coupled differential voltage across the asperity sensor, which corresponds to temperature changes at the asperity sensor over time. The voltage response 754 may have undershoot and/or overshoot features due to filter effects in a preamp (not shown), which may yield false detection of asperities if the 1.0 µs detection window is not utilized.

The voltage response 754 is normalized to approximately 0 volts when no asperities are present. A positive threshold 756 is set at about 50 mV and a negative threshold 758 is set at −50 mV to indicate the presence of an asperity. Variations in the voltage response 754 that do not exceed the thresholds 756, 758 indicate baseline noise or asperities with small enough dimensions that they are ignored.

In an example implementation, voltage response 754 is used only for detecting protruding asperities. Voltage response 754 first exceeds the positive threshold 756 at about 1.3 µs at point 766. This is an initial crossing and is increasing in magnitude. This indicates the presence of a recessed asperity and triggers the start of timing window 768, which is preconfigured as 1.0 µs in duration.

The voltage response 754 drops below the positive threshold 756 at about 1.9 µs at point 770 and drops below the negative threshold 758 at about 2.2 µs at point 772. Since the timing window 768 corresponds to a possible recessed asperity and voltage response 754 is used only for detecting protruding asperities, points 766, 770, and 772 are ignored.

After the expiration of the timing window 768, the voltage response 754 next crosses a threshold (i.e., the negative threshold 758) at about 2.8 µs at point 774. Normally, the threshold crossing at point 774 would trigger a new timing window 776. However, since the crossing at point 774 is decreasing in magnitude, it is ignored (as illustrated by the "X" through timing window 776.

In one implementation, an asperity detection bit is set at "1" throughout the 0.0 µs-5.0 µs timeframe because the only initial crossing was positive and increasing in magnitude. An enabling bit is set at "1," which indicates that asperity discriminator is enabled. An asperity type bit is set at "0," which indicates that the preamp is directed to detect protruding asperities only. Since the timing window 768 does not indicate the presence of a protruding asperity, no fault is output for the depicted 0.0 µs-5.0 µs timeframe.

In another implementation, the voltage response 754 may be used to detect recessed asperities only. If a user wishes to detect recessed asperities, the user will then set the asperity type bit to "1." Since a positive threshold crossing occurs at point 766 and the crossing is increasing in magnitude, a fault is posted to the fault pin for the time duration between point 766 and point 770. All other threshold crossings are ignored (e.g., at point 772) within the timing window 768. The crossing at point 774 is decreasing in magnitude and therefore ignored (as illustrated by the "X" through timing window 776). In yet another implementation, the voltage response 754 may be used to detect recessed asperities and protruding asperities simultaneously. For example, the voltage response 754 may be used to generate two fault line bits, one corresponding to recessed asperities and one corresponding to protruding asperities.

Figure 8:
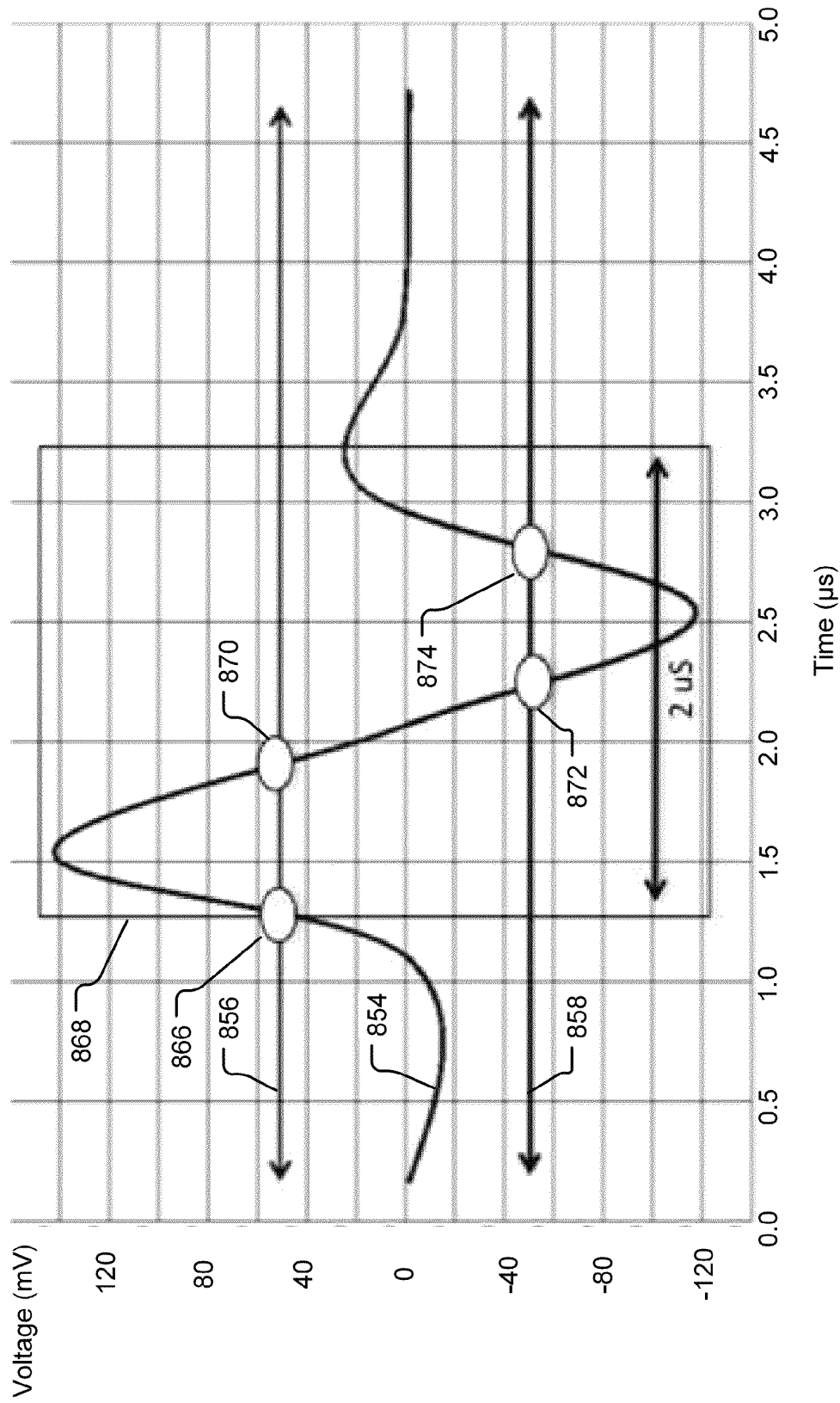
FIG. 8 illustrates a voltage response of an example asperity sensor with a 2.0 µs detection window setting and no asperities detected.

FIG. 8 illustrates a voltage response 854 of an example asperity sensor (not shown) with a 2.0 µs detection window setting and no asperities detected. The voltage response 854 is a plot of AC-coupled differential voltage across the asperity sensor, which corresponds to temperature changes at the asperity sensor over time. The voltage response 854 may have undershoot and/or overshoot features due to filter effects in a preamp (not shown), which may yield false detection of asperities if the 2.0 µs detection window is not utilized.

The voltage response 854 is normalized to approximately 0 volts when no asperities are present. A positive threshold 856 is set at about 50 mV and a negative threshold 858 is set at −50 mV to indicate the presence of an asperity. Variations in the voltage response 854 that do not exceed the thresholds 856, 858 indicate baseline noise or asperities with small enough dimensions that they are ignored.

In an example implementation, voltage response 854 is used only for detecting protruding asperities. Voltage response 854 first exceeds the positive threshold 856 at about 1.3 µs at point 866. This is an initial crossing and is increasing in magnitude. This indicates the presence of a possible recessed asperity and triggers the start of timing window 868, which is preconfigured as 2.0 µs in duration. The voltage response 854 drops below the positive threshold 856 at about 1.9 µs at point 870, drops below the negative threshold 858 at about 2.2 µs at point 872, and rises back above negative threshold 856 at about 2.8 µs at point 874. Since the timing window 868 corresponds to a possible recessed asperity and voltage response 854 is used only for detecting protruding asperities, points 866, 870, 872, 874 are ignored.

In one implementation, an asperity detection bit is set at "1" throughout the 0.0 µs-5.0 µs timeframe because the only initial crossing was positive and increasing in magnitude. An enabling bit is set at "1," which indicates that asperity discriminator is enabled. An asperity type bit is set at "0," which indicates that the preamp is directed to detect protruding asperities only. Since the timing window 868 does not indicate the presence of a protruding asperity, no fault is output for the depicted 0.0 µs-5.0 µs timeframe.

In another implementation, the voltage response 854 may be used to detect recessed asperities only. If a user wishes to detect recessed asperities, the user will then set the asperity type bit to "1." Since a positive threshold crossing occurs at point 866 and the crossing is increasing in magnitude, a fault is posted to the fault pin for the time duration between point 866 and point 870. All other threshold crossings are ignored (e.g., at points 872, 874) within the timing window 868. In yet another implementation, the voltage response 854 may be used to detect recessed asperities and protruding asperities simultaneously. For example, the voltage response 854 may be used to generate two fault line bits, one corresponding to recessed asperities and one corresponding to protruding asperities.

Figure 9:
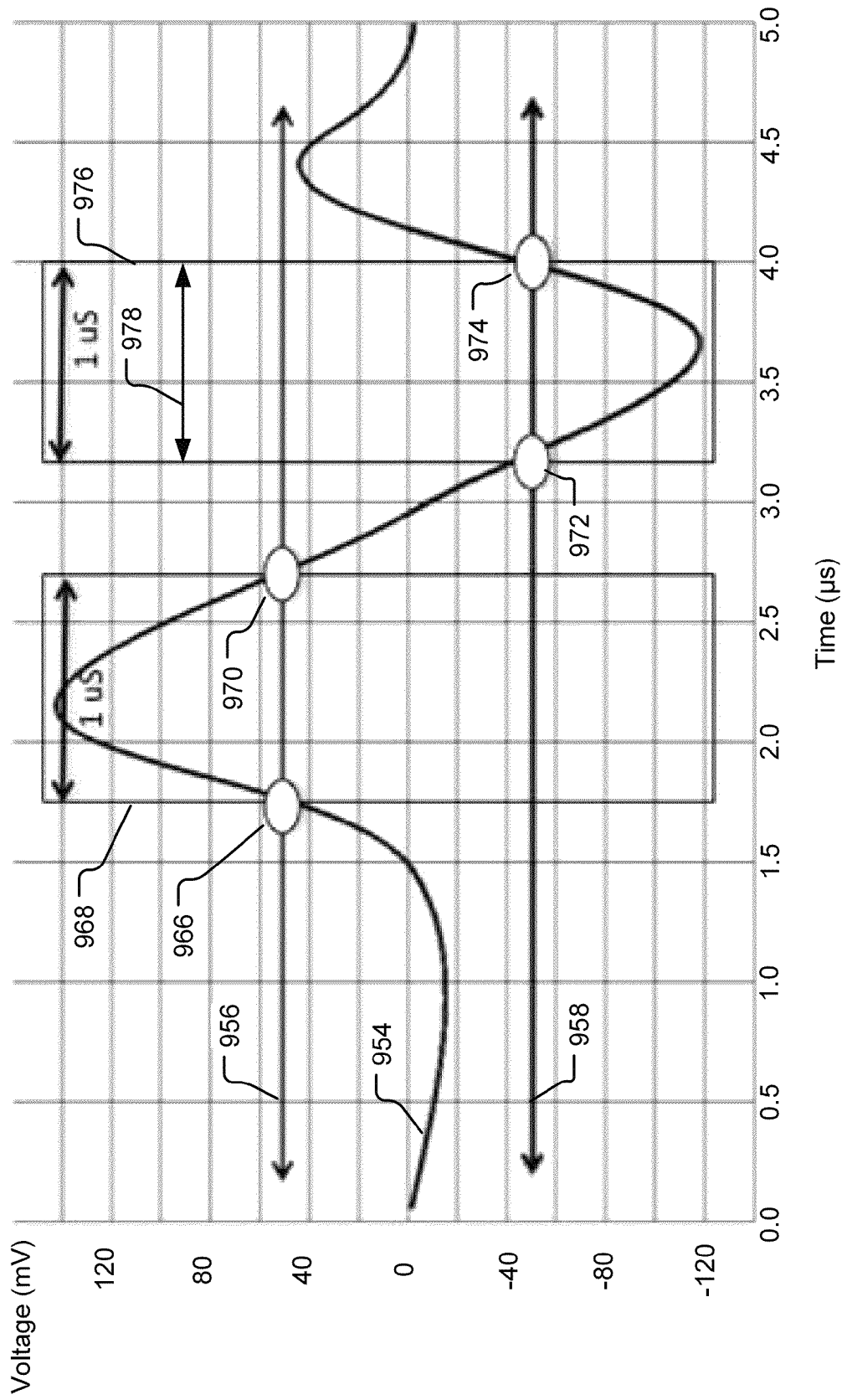
FIG. 9 illustrates a voltage response of an example asperity sensor with a 1.0 µs detection window setting and one protruding asperity detected.

FIG. 9 illustrates a voltage response 954 of an example asperity sensor (not shown) with a 1.0 µs detection window setting and one protruding asperity detected. The voltage response 954 is a plot of AC-coupled differential voltage across the asperity sensor, which corresponds to temperature changes at the asperity sensor over time. The voltage response 954 may have undershoot and/or overshoot features due to filter effects in a preamp (not shown), which may yield false detection of asperities if the 1.0 μs detection window is not utilized.

The voltage response 954 is normalized to approximately 0 volts when no asperities are present. A positive threshold 956 is set at about 50 mV and a negative threshold 958 is set at −50 mV to indicate the presence of an asperity. Variations in the voltage response 954 that do not exceed the thresholds 956, 958 indicate baseline noise or asperities with small enough dimensions that they are ignored.

In an example implementation, voltage response 954 is used only for detecting protruding asperities. Voltage response 954 first exceeds the positive threshold 956 at about 1.7 μs at point 966. This is an initial crossing and is increasing in magnitude. This indicates the presence of a recessed asperity and triggers the start of timing window 968, which is preconfigured as 1.0 μs in duration.

The voltage response 954 drops below the positive threshold 956 at about 2.7 μs at point 970. Since the timing window 968 corresponds to a possible recessed asperity and voltage response 954 is used only for detecting protruding asperities, points 966, 970 are ignored.

After the expiration of the timing window 968, the voltage response 954 next crosses a threshold (i.e., the negative threshold 958) at about 3.1 μs at point 972. This is an initial crossing and is increasing in magnitude. This indicates the presence of a protruding asperity and triggers the start of timing window 976. The voltage response 954 rises above the negative threshold 958 at about 4.0 μs at point 974. This indicates a protruding asperity between point 972 and point 974 and a fault is output for about the 3.1 μs-4.0 μs timeframe (see arrow 978).

In one implementation, an asperity detection bit is set at "1" throughout the 0.0 μs-5.0 μs timeframe because the only detected fault is a recessed asperity, that is unless the fault is cleared between point 970 and point 972. If the fault is cleared between point 970 and point 972, then a "0" is loaded into the asperity detection bit at about 3.1 μs and it would stay there for the remainder of the 5 μs time frame. An enabling bit is set at "1," which indicates that asperity discriminator is enabled. An asperity type bit is set at "0," which indicates that the preamp is directed to detect protruding asperities only. A fault is output for about the 3.1 μs-4.0 μs timeframe (see arrow 978).

In another implementation, the voltage response 954 may be used to detect recessed asperities only. If a user wishes to detect recessed asperities, the user will then set the asperity type bit to "1." Since a positive threshold crossing occurs at point 966 and the crossing is increasing in magnitude, a fault is posted to the fault pin for the time duration between point 966 and point 970. Since the timing window 976 corresponds to a possible protruding asperity and voltage response 954 is used only for detecting recessed asperities, points 972, 974 are ignored. In yet another implementation, the voltage response 954 may be used to detect recessed asperities and protruding asperities simultaneously. For example, the voltage response 954 may be used to generate two fault line bits, one corresponding to recessed asperities and one corresponding to protruding asperities.

In other implementations, the voltage response 954 ranges from about 1.2V to −0.6V. Further, the thresholds 956, 958 are set at about 0.2V and −0.1V. Still further, an asperity may be detected within about a $2.0 \times 10^{-7}$ second range of the voltage response 354. Other variations of the voltage response 954 are contemplated herein.

Figure 10:
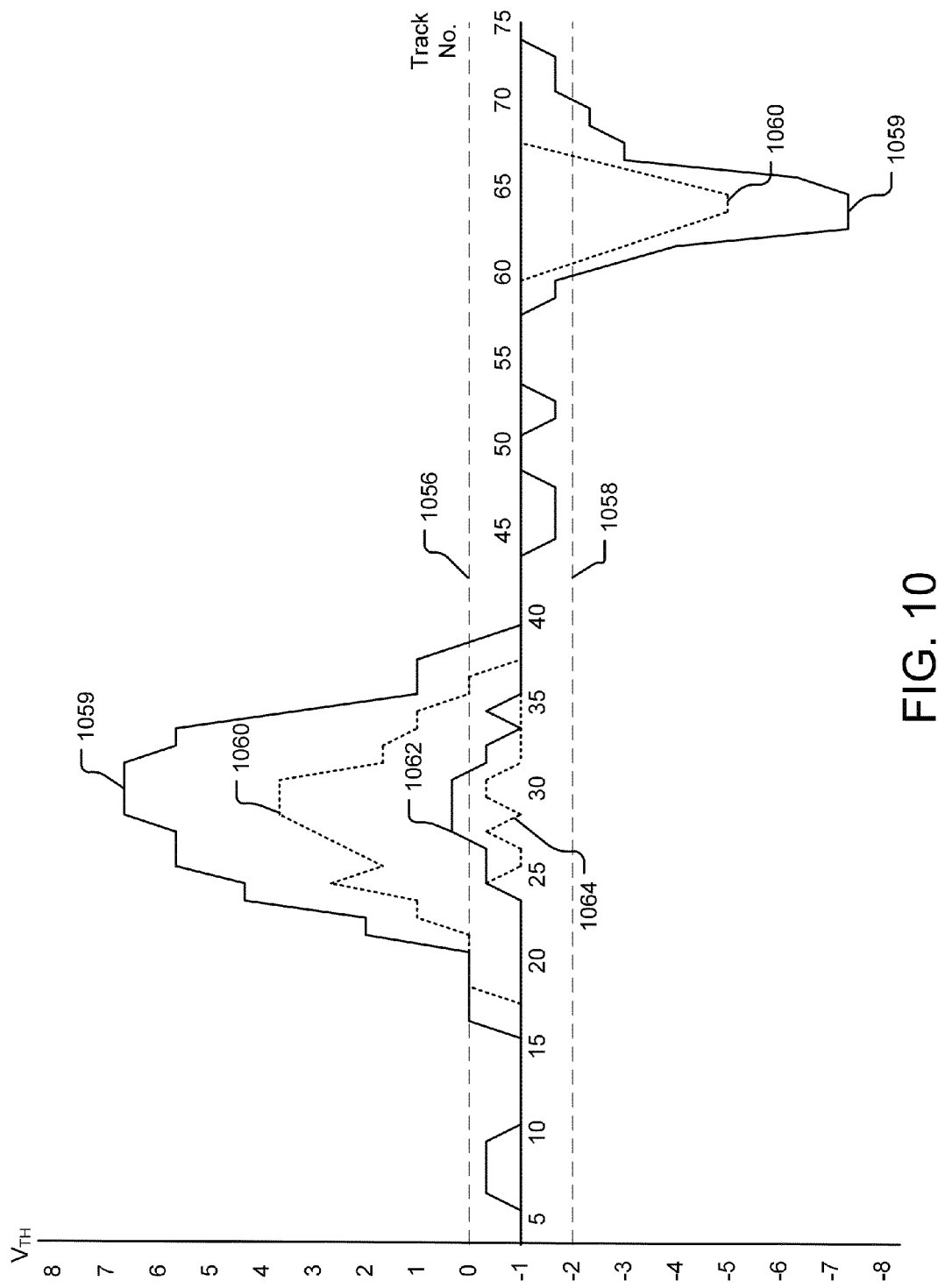
FIG. 10 illustrates four cross-track voltage profiles of an example asperity sensor as the asperity sensor passes over a media surface at a variety of fly heights.

FIG. 10 illustrates four cross-track voltage profiles 1059, 1060, 1062, 1064 of an example asperity sensor as the asperity sensor passes over a media surface at a variety of fly heights. The voltage profiles 1059, 1060, 1062, 1064 are plots of threshold voltage that corresponds to voltage measured across the asperity sensor as a function of cross-track position of the asperity sensor. As temperature drops at the asperity sensor, the resistance of the asperity sensor also drops, and thus the threshold voltage across the asperity sensor increases with a negative polarity. Similarly, as the temperature rises at the asperity sensor, the resistance of the asperity sensor also rises, and thus the differential voltage across the asperity sensor increases with a positive polarity (or increases from −1 to 0 volts). In some implementations, only voltages corresponding to detected asperities as per FIGS. 3-9 are used to form the cross-track voltage profiles 1059, 1060, 1062, 1064.

The cross-track voltage profiles 1059, 1060, 1062, 1064 may be constructed from digital data from a plurality of voltage responses collected and stored when passing the asperity sensor over the surface in a down-track direction (see e.g., voltage responses 354-954 of FIGS. 3-9). In one implementation, the cross-track voltage profiles 1059, 1060, 1062, 1064 each illustrate asperities and voids of tracks 5-70 within a selected geometric sector or radius of a circular media. The cross-track voltage profiles 1059, 1060, 1062, 1064 vary by fly-height of the asperity sensor over the media surface. Tracks 5-70 are selected for illustration purposes, but any larger or smaller grouping of tracks may be used to construct a cross-track voltage profile. Further, more voltage profiles may be used to characterize dimensions of an asperity (e.g., voltage profiles corresponding to each of 15, 25, 35, 45, 55, 65, 75, 85, and 95 angstrom fly heights).

In some implementations, stored digital data from a plurality of voltage responses collected and stored when passing the asperity sensor over the surface in a down-track direction is digital-to-analog converted to construct the depicted voltage profiles 1059, 1060, 1062, 1064. Further, the voltage profiles 1059, 1060, 1062, 1064 may be normalized, amplified, and/or filtered (see e.g., sensor driver 248 of FIGS. 2A and 2B) to emphasize voltage changes that correspond to temperature changes at the asperity sensor over time and deemphasize baseline noise. In the implementation shown in FIG. 10, the voltage profiles 1059, 1060, 1062, 1064 are normalized to approximately −1 volts when no asperities or voids are present. Voltages greater than −1 volts indicate the presence of a void and voltages less than −1 volts indicate the presence of an asperity. The magnitude of the negative polarity voltage indicates the height of a protruding asperity. In other implementations, the voltage profiles 1059, 1060, 1062, 1064 may be normalized to any convenient positive to negative voltage magnitude. Further, a positive threshold 1056 is set at 0 volts and a negative threshold 1058 is set at −2 volts to indicate the presence of an asperity. Variations in the voltage profiles 1059, 1060, 1062, 1064 that do not exceed the thresholds 1056, 1058 indicate baseline noise or asperities with small enough dimensions that they are ignored. The thresholds 1056, 1058 may be set at any value and may be adjusted in real time to calibrate the minimum size of detected asperities.

The voltage profile 1059 is constructed from a plurality of voltage responses collected and stored when passing the asperity sensor over the surface in a down-track direction at a minimum fly height (e.g., 15 angstroms). The voltage profile 1059 indicates a small void asperity or noise artifact is located between approximately tracks 5 and 10. Since this asperity or noise artifact is below the void threshold of 0 volts, it is ignored. Further, the voltage profile 1059 indicates a larger void asperity is located between approximately tracks 15 and 40, which is a cross-track dimension of the void. The profile 1059 peaks at about 6.5 volts, which approximately corresponds to a center of the void at approximately track 30.

Still further, the voltage profile 1059 indicates two small protruding asperities or noise artifacts are located approximately between tracks 43 and 48 and between tracks 51 and 54. Since these asperities or noise artifacts are above the asperity threshold of −2 volts, they are ignored. Further yet, the voltage profile 1059 indicates a large protruding asperity is located between approximately tracks 57 and 75, which is a cross-track dimension of the asperity. The profile 1059 peaks at about −7.5 volts, which approximately corresponds to a peak height of the asperity at approximately track 65.

The voltage profile 1060 is constructed from a plurality of voltage responses collected and stored when passing the asperity sensor over the surface at a greater fly height than that which corresponds to the voltage profile 1059 (e.g., 30 angstroms). The small asperity or noise artifact located between approximately tracks 5 and 10 is no longer detected with the asperity sensor fly height of voltage profile 1060. The large void asperity located between approximately tracks 15 and 40 is still detected, but with a reduced peak voltage at about 3.5 volts and a reduced cross-track dimension between approximately tracks 17 and 37.

The two small asperities or noise artifacts located approximately between tracks 43 and 48 and between tracks 51 and 54 are also no longer detected with the asperity sensor fly height of voltage profile 1060. The large protruding asperity located between approximately tracks 57 and 75 is still detected, but with a reduced peak voltage at about −5 volts and a reduced cross-track dimension between approximately tracks 60 and 67.

The voltage profile 1062 is constructed from a plurality of voltage responses collected and stored when passing the asperity sensor over the surface at a greater fly height than that which corresponds to the voltage profile 1060 (e.g., 60 angstroms). The large void asperity located between approximately tracks 15 and 40 is still detected, but with a reduced peak voltage at about 0.2 volts and a reduced cross-track dimension between approximately tracks 24 and 35. The large protruding asperity located between approximately tracks 57 and 75 is no longer detected with the asperity sensor fly height of voltage profile 1062. Since the large asperity located between approximately tracks 57 and 75 was detected at a fly height of 30 angstroms (see voltage profile 1060) and no longer detected at a fly height of 60 angstroms (see voltage profile 1062), a height dimension of the large asperity is approximately 30 angstroms.

The voltage profile 1064 is constructed from a plurality of voltage responses collected and stored when passing the asperity sensor over the surface at a greater fly height than that which corresponds to the voltage profile 1062 (e.g., 100 angstroms). In one implementation, the fly height represented by voltage profile 1064 is the maximum fly height of a transducer head (i.e., heater power is off). The large void asperity located between approximately tracks 15 and 40 is still detected, but with a reduced peak voltage at about −0.2 volts. Since this voltage is below the void threshold of 0 volts, the large void asperity is ignored when the head is at a fly height equal to or greater than 100 angstroms.

A down-track dimension of each detected asperity may be determined from voltage responses collected and stored and error codes received when passing the asperity sensor over the surface in a down-track direction (see e.g., voltage responses 354-954 of FIGS. 3-9, respectively). A cross-track dimension of each asperity may be determined from a grouping of voltage profiles and error codes corresponding to a grouping of tracks (e.g., voltage profiles 1059, 1060, 1062, 1064 for tracks 5-75). A height dimension of each protruding asperity may be determined from a grouping of voltage profiles that vary by fly height (e.g., voltage profiles 1059, 1060, 1062, 1064 for fly heights of 15, 30, 60, and 100 angstroms, respectively).

In another implementation, the cross-track dimension of each detected asperity may be calculated empirically using software code analysis of tabulated detected asperities as per FIGS. 3-9. Detected asperities in close proximity to one another may be grouped and identified as a common asperity with dimensions corresponding to the outer bounds of asperity detection in the down-track and cross-track directions. In this implementation, the cross-track voltage profiles 1059, 1060, 1062, 1064 of FIG. 10 are not used. Further, in some implementations, the height dimension of each protruding asperity may not be used either.

Figure 11:
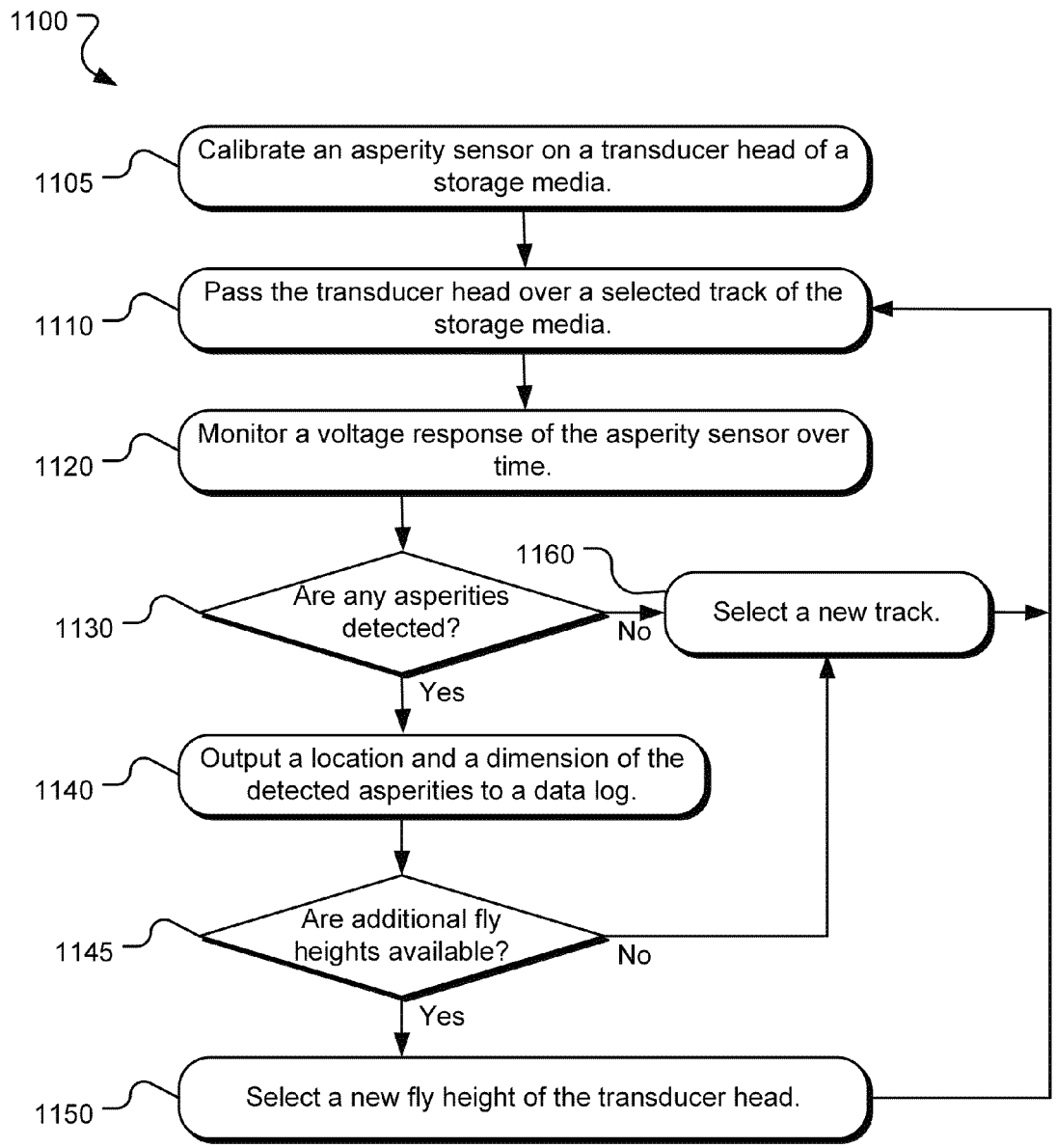
FIG. 11 illustrates example operations for detecting and determining one or more dimensions of asperities on a storage media surface.

FIG. 11 illustrates example operations 1100 for detecting and determining one or more dimensions of asperities on a storage media surface. A calibration operation 1105 calibrates an asperity sensor on a transducer head associated with the storage media. The calibration operation 1105 may include adjusting one or more of bias voltage, gain, and filter settings to account for baseline noise while providing effective detection of asperities on the storage media surface. In one implementation, baseline noise is calibrated at a variety of radial positions and frequency zones of the storage media by counting faults (i.e., events where a differential voltage across the asperity sensor exceeds a positive and/or a negative threshold) at each radial position and frequency zone. The positive and negative voltage thresholds are increased until faulting is reduced to a low level or eliminated altogether. Further, a fixed offset voltage may be applied to the differential voltage across the asperity sensor to minimize false detections of asperities. The fixed offset voltage is used as a threshold for detecting asperities.

A passing operation 1110 passes the transducer head over a selected track of the storage media. During the passing operation 1110, the transducer head operates within a frequency zone associated with the selected track. In disc storage media, the track is one of many concentric circular tracks on the storage media. The transducer head flies in close proximity to the media surface as it passes over the selected track. The height of the transducer head as it flies above the media surface is referred to herein as fly height. In some implementations, more than one frequency zone is associated with the selected track and the passing operation 1110 is performed using each frequency zone associated with the selected track.

A monitoring operation 1120 monitors a voltage response of the asperity sensor over time. An asperity causes a change in relative fly height of the transducer head, which causes a change in convective cooling characteristics of the transducer head. Generally, increased fly height decreases convective cooling and decreased fly height increases convective cooling. Further, if an asperity protrudes from the media surface a distance that exceeds the fly height, the asperity may impact and heat the transducer head through conduction and/or frictional forces.

The asperity sensor detects the asperities by monitoring a change in temperature in the transducer head. Changes in temperature are related to a change in resistance of the asperity sensor. A voltage is applied to the asperity sensor and changes in voltage across the asperity sensor indicate the presence of an asperity. In some implementations, the monitoring operation 1120 is performed in a single pass over the selected track in the passing operation 1110.

A decision operation 1130 determines if any asperities are detected on the selected track. One or more voltage thresholds and/or timing windows may be applied to a read-back voltage profile from the asperity sensor in decision operation 1130. If, where, and how the threshold(s) are exceeded determines if an asperity is detected (see FIGS. 12 and 13 for details on one implementation of detecting asperities). If one or more asperities are detected, an outputting operation 1140 outputs the location and a dimension of the asperity to a system-level data log (e.g., via faults on the hardware fault line). For example, the outputting operation 1140 may indicate one or more track sectors where an asperity is detected. Further, a number of consecutive track sectors where an asperity is detected provides a down-track dimension of the asperity. The outputting operation 1140 may also define a location of the asperity by head, track, servo wedge, and position from index.

Each of the track, servo wedge, and position from index may include a range that provides a dimension of the asperity. Further, ranges of track, servo wedge, and position from index that indicate an asperity that spans multiple tracks and servo wedges may be grouped with a unique identifier, noting start and end locations of the asperity and a number and polarity of detected errors within the grouped range.

Still further, there may be an offset between the detected location of the asperity and the location of the read element and/or write element (whichever is calculated to be the closest point to the media during normal media operation) on the transducer head. This offset is caused by a distance between the asperity sensor and the read element and/or write element within the transducer head. Further, the offset between the detected location of the asperity and the location of the read element and/or write element may vary depending on a skew of an arm associated with the transducer head and the storage media itself (e.g., this effect may be most pronounced at innermost and/or outermost locations on the storage media). Since this is a fixed geometric effect, an offset factor may be included to relate the detected location of the asperity to the actual location of the read element and/or write element, depending on the skew of the arm associated with the transducer head and the storage media at the currently selected track.

A decision operation 1145 determines if any additional fly heights are available on the selected track. If so, a selection operation 1150 selects a new fly height of the transducer head. In one implementation, the selection operation 1150 is accomplished by changing a power output to one or more heaters within the transducer head, which control a distance that microelectronic structures (e.g., a read element and a write element) within the transducer head protrude toward the storage media. Operations 1110, 1120, 1130, 1140, 1145, and 1150 are iteratively repeated until no asperities are detected in decision operation 1130 or no additional fly heights are available as determined by decision operation 1145. In various implementations, the changing operation 1150 progressively increases or decreases the fly height with each iteration. In one implementation, the minimum fly height where an asperity is no longer detected provides a height dimension of the asperity. If an asperity is still detected at the highest fly height, the asperity will always be in contact with the head in that location and the outputting operation 1140 location logs the location as such and that location is avoided during regular operation of the storage media operation.

If no asperities are detected in decision operation 1130 or no additional fly heights are available as determined by decision operation 1145, selecting operation 1160 selects a new track for performing operations 1110, 1120, 1130, 1140, and 1150. Operations 1100 may be repeated iteratively until all tracks are used.

Operations 1100 may be performed once to map asperities on the media surface in order to select or avoid regions of the media for reading/writing data and/or to set fly the height of the transducer head. In some implementation, operations 1100 may be performed periodically to detect any changes in asperities on the media surface.

Further, media locations that are determined to contain a protruding asperity with a height that may impact the transducer head, as discussed in detail above, are padded from the transducer head. This is accomplished by disabling one or more transducer head heaters when moving over the protruding asperity to move over the protruding asperity at a maximum fly height. Further, media locations adjacent to a protruding asperity may also be padded or spared from use to minimize the potential for contact between the protruding asperity and the transducer head. Sparing media locations adjacent to a protruding asperity from use prevents modulation during media writing, but does not require that the heater (s) be disabled in those locations.

Figure 12:
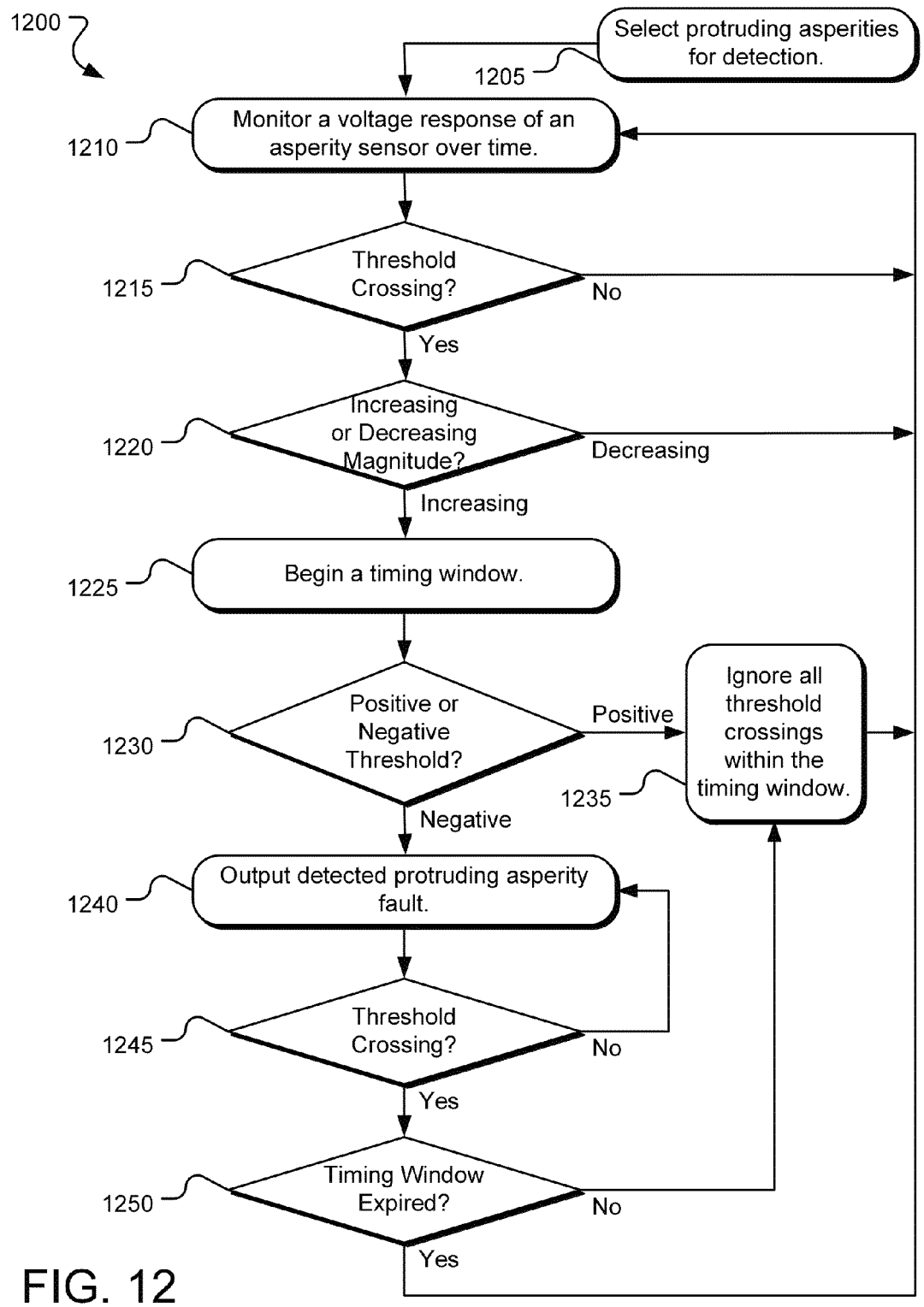
FIG. 12 illustrates example operations for distinguishing protruding asperities from recessed asperities on a storage media surface and outputting protruding asperities as faults.

FIG. 12 illustrates example operations 1200 for distinguishing protruding asperities from recessed asperities on a storage media surface and outputting protruding asperities as faults. A selecting operation 1205 selects protruding asperities for detection by an asperity discriminator. In other implementations, recessed asperities are selected for detection (see e.g., selecting operation 1305 of FIG. 13) or both protruding and recessed asperities are selected for detection by the asperity discriminator. In one implementation, by selecting only protruding asperities for detection, the operations 1200 may be performed in one pass of a selected track of the storage media.

A monitoring operation 1210 monitors a voltage response of an asperity sensor over time. An asperity causes a change in relative fly height of the transducer head, which causes a change in convective cooling characteristics of the transducer head. Generally, increased fly height decreases convective cooling and decreased fly height increases convective cooling. Further, if an asperity protrudes from the media surface a distance that exceeds the fly height, the asperity may impact and heat the transducer head through conduction and/or frictional forces. The asperity sensor (e.g., asperity sensor 228 of FIGS. 2A and 2B) detects the asperities by monitoring a change in temperature in the transducer head. Changes in temperature are related to a change in resistance of the asperity sensor. A voltage is applied to the asperity sensor and changes in voltage across the asperity sensor indicate the presence of an asperity.

A decision operation 1215 determines if the voltage response of the asperity sensor crosses one of preset positive and negative voltage thresholds. Variations in the voltage response that do not exceed the thresholds indicate baseline noise or asperities with small enough dimensions that they are ignored. If a threshold crossing is not detected, decision operation 215 repeats. Operations 1210 and 1215 are repeated iteratively as voltage response is monitored for threshold crossings.

If and when a threshold crossing is detected, decision operation 1220 determines if the voltage response magnitude is on an increasing or decreasing trend at the time the threshold crossing is detected. If the voltage response magnitude is on a decreasing trend, the detected threshold crossing is ignored as indicating baseline noise or an artifact of a previous detected asperity. The monitoring operation 1210 is then repeated. If the voltage response magnitude is on an increasing trend at the time the threshold crossing is detected, a beginning operation 1225 begins a timing window on the voltage response. The timing window allows subsequent threshold crossings within the window to be grouped with the initial threshold crossing, thereby reducing the detection of false asperities. The duration of the timing window is preset to offer a desired resolution of detection of asperities.

A decision operation 1230 determines whether the detected threshold crossing crossed the positive threshold or the negative threshold on the voltage response. If the voltage response crossed the positive threshold, this suggests the presence of a recessed asperity. However, according to selecting operation 1205, the asperity discriminator is only searching for protruding asperities. As a result, ignoring operation 1235 ignores any and all additional threshold crossings within the timing window and the monitoring operation 1210 is repeated.

If the voltage response crossed the negative threshold, this suggests the presence of a protruding asperity. Outputting operation 1240 outputs a detected protruding asperity fault to the hardware fault line. Decision operation 1245 determines if there has been an additional threshold crossing. If not, outputting operation 1240 repeats. Operations 1240, 1245 repeat iteratively to output faults to the hardware fault line so long as the voltage response has not crossed the negative threshold a second time.

Once decision operation 1245 determines the negative threshold has been crossed a second time, decision operation 1250 determines if the timing window has expired. If not, any additional threshold crossings within the timing window are ignored as likely artifacts of a previous detected asperity and monitoring operation 1210 repeats. Once the decision operation 1250 determines that the timing window has expired, monitoring operation 1210 repeats as well.

Operations 1210-1250 continue until an entire selected track of the storage media surface has been analyzed. Operations 1210-1250 may then be repeated for the same track at different fly heights and/or for different tracks and/or different storage media surfaces. In one implementation, performance of operations 1215-1250 of FIG. 12 is one implementation of decision operation 1130 of FIG. 11.

Figure 13:
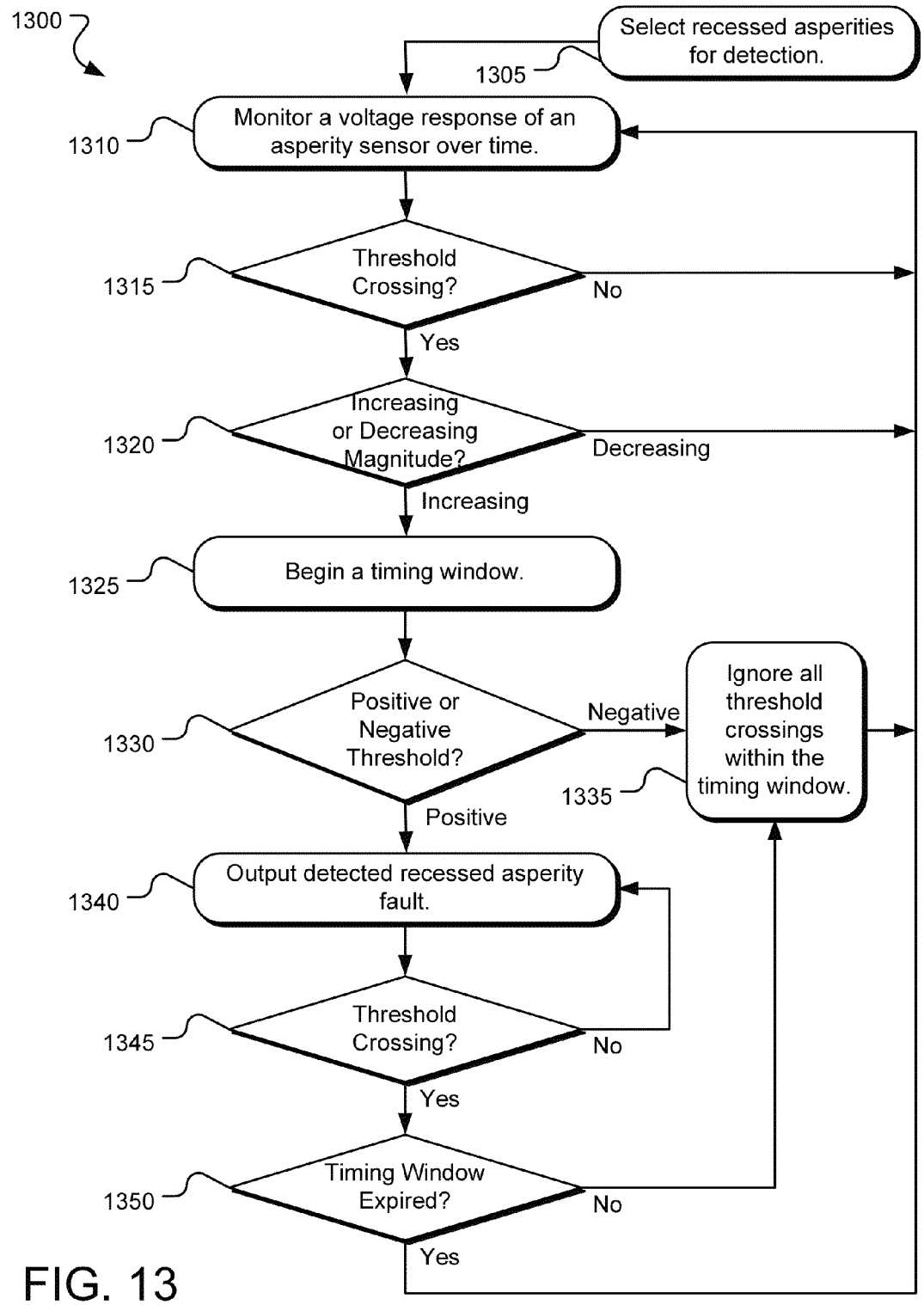
FIG. 13 illustrates example operations for distinguishing protruding asperities from recessed asperities on a storage media surface and outputting recessed asperities as faults.

FIG. 13 illustrates example operations 1300 for distinguishing protruding asperities from recessed asperities on a storage media surface and outputting recessed asperities as faults. A selecting operation 1305 selects recessed asperities for detection by an asperity discriminator. A monitoring operation 1310 monitors a voltage response of an asperity sensor over time.

A decision operation 1315 determines if the voltage response of the asperity sensor crosses one of preset positive and negative voltage thresholds. Variations in the voltage response that do not exceed the thresholds indicate baseline noise or asperities with small enough dimensions that they are ignored. If a threshold crossing is not detected, decision operation 215 repeats. Operations 1310 and 1315 are repeated iteratively as the voltage response is monitored for threshold crossings.

If and when a threshold crossing is detected, decision operation 1320 determines if the voltage response magnitude is on an increasing or decreasing trend at the time the threshold crossing is detected. If the voltage response magnitude is on a decreasing trend, the detected threshold crossing is ignored as indicating baseline noise or an artifact of a previous detected asperity. The monitoring operation 1310 is then repeated. If the voltage response magnitude is on an increasing trend at the time the threshold crossing is detected, a beginning operation 1325 begins a timing window on the voltage response. The timing window allows subsequent threshold crossings within the window to be grouped with the initial threshold crossing, thereby reducing the detection of false asperities. The duration of the timing window is preset to offer a desired resolution of detection of asperities.

A decision operation 1330 determines whether the detected threshold crossing crossed the positive threshold or the negative threshold on the voltage response. If the voltage response crossed the negative threshold, this suggests the presence of a protruding asperity. However, according to selecting operation 1305, the asperity discriminator is only searching for recessed asperities. As a result, ignoring operation 1335 ignores any and all additional threshold crossings within the timing window and the monitoring operation 1310 is repeated.

If the voltage response crossed the positive threshold, this suggests the presence of a recessed asperity. Outputting operation 1340 outputs a detected recessed asperity fault to the hardware fault line. Decision operation 1345 determines if there has been an additional threshold crossing. If not, outputting operation 1340 repeats. Operations 1340, 1345 repeat iteratively to output faults to the hardware fault line so long as the voltage response has not crossed the positive threshold a second time.

Once decision operation 1345 determines the positive threshold has been crossed a second time, decision operation 1350 determines if the timing window has expired. If not, any additional threshold crossings within the timing window are ignored as likely artifacts of a previous detected asperity and monitoring operation 1310 repeats. Once the decision operation 1350 determines that the timing window has expired, monitoring operation 1310 repeats as well.

Operations 1310-1350 continue until an entire selected track of the storage media surface has been analyzed. Operations 1310-1350 may then be repeated for the same track at different fly heights and/or for different tracks and/or different storage media surfaces. In one implementation, performance of operations 1315-1350 of FIG. 13 is one implementation of decision operation 1130 of FIG. 11.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, adding and/or omitting operations as desired, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:
1. A method comprising:
 selecting for detection one of protruding and recessed asperities on a storage media surface;
 detecting an initial amplitude threshold crossing of a detection signal;

starting a timing window at the initial amplitude threshold crossing;

detecting a subsequent amplitude threshold crossing within the timing window; and detecting a selected asperity on the storage media surface based on the initial amplitude threshold crossing and the subsequent amplitude threshold crossing.

2. The method of claim 1, further comprising disabling one or more transducer head heaters when moving a transducer head over a protruding asperity on the storage media surface.

3. The method of claim 1, wherein the asperity detection signal is a voltage over time signal and the amplitude threshold crossings are voltages.

4. The method of claim 1, further comprising disabling one or more transducer head heaters when moving a transducer head over an area adjacent to a protruding asperity on the storage media surface.

5. The method of claim 1, wherein the timing window is started at a first in time detected amplitude threshold crossing that is increasing in magnitude and has a polarity corresponding to the selecting operation.

6. The method of claim 1, wherein the initial amplitude threshold crossing is increasing in magnitude and the subsequent amplitude threshold crossing is decreasing in magnitude.

7. The method of claim 1, wherein the detecting operation includes ignoring threshold crossings subsequent to the initial and subsequent amplitude threshold crossings within the preset timing window.

8. The method of claim 1, further comprising:
outputting one or more fault codes associated with the detected asperity, wherein a quantity of the fault codes corresponds to a length of the detected asperity.

9. The method of claim 1, wherein the detection signal corresponds to a resistance change across an asperity sensor.

10. The method of claim 9, wherein the resistance change across the asperity sensor is a result of a temperature change at the asperity sensor.

11. The method of claim 9, wherein the asperity sensor is located on a transducer head and operates independently of a read element on the transducer head.

12. An asperity detection system comprising:
a temperature-dependent resistive asperity sensor; and
a preamplifier that selects for detection one of protruding and recessed asperities on a storage media surface, detects an initial threshold crossing of a detection signal, starts a timing window at the initial threshold crossing, detects a subsequent threshold crossing within the timing window, and detects a selected asperity on the storage media surface based on the initial threshold crossing and the subsequent threshold crossing within the timing window defined by a partial pass of a selected track of the storage media surface.

13. The asperity detection system of claim 12, wherein the preamplifier disables one or more transducer head heaters when moving over a detected protruding asperity on the storage media surface.

14. The asperity detection system of claim 12, wherein the preamplifier receives a resistance change at the temperature-dependent resistive asperity sensor as an asperity detection signal.

15. The asperity detection system of claim 12, wherein the preamplifier further comprises:
a sensor bias to apply a bias voltage across the asperity sensor and a sensor driver to receive a biased voltage change and output an amplitude varied voltage corresponding to the resistance change.

16. The asperity detection system of claim 15, wherein the preamplifier further comprises:
a comparator to receive the amplitude varied voltage and perform a comparison to determine if one or more thresholds are exceeded to detect the asperity.

17. The asperity detection system of claim 12, wherein the asperity sensor is located on a transducer head and operates independently of a read element on the transducer head.

18. A method comprising:
passing a transducer head over a storage media surface;
selecting for detection one of protruding and recessed asperities on the storage media surface; and
detecting a selected asperity on the storage media surface using a temperature change at an asperity sensor on the transducer head, the temperature change occurring within a preset timing window defined by a partial pass of a selected track on the storage media surface; and
disabling one or more transducer head heaters when moving the transducer head over a detected protruding asperity on the storage media surface.

19. The method of claim 18, wherein the detecting operation is performed using two amplitude threshold crossings of an asperity detection signal received from the asperity sensor.

20. The method of claim 18, further comprising disabling one or more transducer head heaters when moving the transducer head over an area adjacent to the detected protruding asperity on the storage media surface.

* * * * *